United States Patent
Evans et al.

(10) Patent No.: US 9,493,298 B2
(45) Date of Patent: Nov. 15, 2016

(54) JUICING SYSTEMS AND METHODS

(71) Applicant: Juicero, Inc., San Francisco, CA (US)

(72) Inventors: Douglas Evans, Brooklyn, NY (US); Paul Katz, Palo Alto, CA (US)

(73) Assignee: Juicero, Inc., San Francisco, CA (US)

( * ) Notice: Subject to any disclaimer, the term of this patent is extended or adjusted under 35 U.S.C. 154(b) by 0 days.

(21) Appl. No.: 14/850,894

(22) Filed: Sep. 10, 2015

(65) Prior Publication Data
US 2016/0000135 A1 Jan. 7, 2016

Related U.S. Application Data

(63) Continuation of application No. PCT/US2014/034676, filed on Apr. 18, 2014.

(60) Provisional application No. 61/962,316, filed on May 10, 2013.

(51) Int. Cl.
| | |
|---|---|
| *B30B 7/04* | (2006.01) |
| *B30B 9/04* | (2006.01) |
| *B65D 83/00* | (2006.01) |
| *A23N 1/00* | (2006.01) |

(Continued)

(52) U.S. Cl.
CPC ............ *B65D 85/8043* (2013.01); *A23L 2/04* (2013.01); *A23N 1/00* (2013.01); *A23N 1/02* (2013.01); *A47J 19/02* (2013.01); *A47J 19/06* (2013.01); *B30B 7/04* (2013.01); *B30B 9/04* (2013.01); *B30B 9/20* (2013.01); *B65D 77/04* (2013.01); *B65D 79/02* (2013.01); *B65D 85/34* (2013.01); *A23V 2002/00* (2013.01)

(58) Field of Classification Search
CPC ............ B30B 9/04; B30B 9/06; B30B 9/20; B30B 7/04; B65D 77/04; B65D 85/34; B65D 79/02; A47J 19/02; A23N 1/00; A23N 1/02; A23J 2/04; A23V 2002/00; B01D 35/28
USPC ......... 100/108, 109, 264, 315, 316, 319, 43, 100/50, 51
See application file for complete search history.

(56) References Cited

U.S. PATENT DOCUMENTS

| | | |
|---|---|---|
| 34,241 A | 1/1862 | Codding |
| 260,542 A | 7/1882 | Dannecker |

(Continued)

FOREIGN PATENT DOCUMENTS

| | | |
|---|---|---|
| CH | 605293 A5 | 9/1978 |
| CN | 100484443 C | 5/2009 |

(Continued)

*Primary Examiner* — Jimmy T Nguyen
(74) *Attorney, Agent, or Firm* — Wolf, Greenfield & Sacks, P.C.

(57) ABSTRACT

Juicing methods and apparatuses for extracting juice from food matter using juicer cartridges are described. In one instance, a juicer cartridge may include one or more separate internal compartments. Food matter loaded into the juicer cartridge may be compressed by a corresponding juicer and expelled through an outlet that may be sealed until activation. Food matter may be pre-sized according to various physical characteristics, and the juicer cartridge may be injected with a gas to enhance shelf life and reduce nutrient loss. The juicer may also be provided with "smart" functionality to provide safety features, track usage, and enhance the operator experience. Several possible packing systems for preparing juicer cartridges are also described.

10 Claims, 15 Drawing Sheets

(51) Int. Cl.
  *A23L 2/04* (2006.01)
  *A47J 19/02* (2006.01)
  *A47J 19/06* (2006.01)
  *B65D 85/804* (2006.01)
  *B65D 79/02* (2006.01)
  *B65D 85/34* (2006.01)
  *B65D 77/04* (2006.01)
  *B30B 9/20* (2006.01)
  *A23N 1/02* (2006.01)

(56) References Cited

U.S. PATENT DOCUMENTS

| | | | |
|---|---|---|---|
| 603,323 | A | 5/1898 | Eckart |
| 626,646 | A | 6/1899 | Baggett |
| 729,807 | A | 6/1903 | Stoveken |
| 1,065,335 | A | 6/1913 | Barton et al. |
| 1,130,701 | A | 3/1915 | Berrigan |
| 1,354,517 | A * | 10/1920 | Sollazzo ............... B30B 9/06 100/116 |
| 1,410,301 | A | 3/1922 | Hauf |
| 1,676,102 | A | 7/1928 | Lynam |
| 2,022,679 | A | 12/1935 | Leo |
| 2,235,028 | A | 3/1941 | Leo et al. |
| 2,346,375 | A | 4/1944 | Harris |
| 2,420,680 | A | 5/1947 | Pipkin |
| 2,612,100 | A * | 9/1952 | Bates ............... A47J 19/02 100/122 |
| 2,688,914 | A | 9/1954 | Eckler |
| 2,846,863 | A | 8/1958 | Sibbald |
| 3,159,096 | A | 12/1964 | Tocker |
| 3,289,844 | A | 12/1966 | Emele |
| 3,334,790 | A | 8/1967 | Eaton |
| 3,557,788 | A | 1/1971 | Swartz |
| 3,995,544 | A | 12/1976 | Farley |
| 4,151,795 | A | 5/1979 | Huaser |
| 4,211,156 | A * | 7/1980 | Zimmermann ............ A47G 19/16 206/0.5 |
| 4,219,425 | A | 8/1980 | Yoshida |
| 4,306,492 | A | 12/1981 | Zimmermann |
| 4,350,089 | A | 9/1982 | Braun |
| 4,420,404 | A | 12/1983 | Coate et al. |
| 4,421,021 | A | 12/1983 | Holbrook |
| 4,448,686 | A | 5/1984 | Friedman |
| 4,516,490 | A | 5/1985 | Hartmann |
| 4,539,793 | A | 9/1985 | Malek |
| 4,680,808 | A | 7/1987 | Paleschuck |
| 4,884,755 | A | 12/1989 | Hedrington |
| 4,892,665 | A | 1/1990 | Wettlaufer |
| 4,900,436 | A | 2/1990 | Iwatani |
| 4,986,912 | A | 1/1991 | Fisch |
| 5,031,524 | A | 7/1991 | Wettlaufer |
| 5,045,186 | A | 9/1991 | Takashima |
| 5,075,122 | A | 12/1991 | Barron et al. |
| 5,267,509 | A | 12/1993 | Wettlaufer |
| 5,277,810 | A * | 1/1994 | Shepard ............... A47J 19/02 100/125 |
| 5,312,754 | A | 5/1994 | Bryan-Brown |
| 5,355,785 | A | 10/1994 | Pera et al. |
| 5,445,068 | A * | 8/1995 | Michelson ............ A47J 19/02 241/168 |
| 5,451,415 | A | 9/1995 | Pera et al. |
| 5,479,851 | A | 1/1996 | McClean et al. |
| 5,613,434 | A | 3/1997 | Hartmann |
| 5,680,997 | A | 10/1997 | Hedrington |
| 5,842,603 | A | 12/1998 | Schroeder |
| 5,927,187 | A | 7/1999 | Bosch |
| 6,050,180 | A | 4/2000 | Moline |
| 6,123,018 | A | 9/2000 | Wettlaufer et al. |
| 6,159,527 | A | 12/2000 | Wettlaufer |
| 6,313,194 | B1 | 11/2001 | Yagi et al. |
| 6,395,317 | B1 | 5/2002 | Singh et al. |
| 6,441,340 | B1 | 8/2002 | Varriano-Marston |
| 6,457,403 | B1 | 10/2002 | Wettlaufer et al. |
| 6,461,702 | B2 | 10/2002 | Gong |
| 6,479,092 | B1 | 11/2002 | Wettlaufer |
| 6,530,312 | B1 | 3/2003 | Jakab |
| 6,548,132 | B1 | 4/2003 | Clarke et al. |
| 6,730,874 | B2 | 5/2004 | Varriano-Marston |
| 7,045,339 | B2 | 5/2006 | Sorenson, Jr. et al. |
| 7,083,818 | B2 | 8/2006 | Pratte |
| 7,318,374 | B2 | 1/2008 | Guerrero |
| 7,329,452 | B2 | 2/2008 | Clarke et al. |
| 7,395,753 | B2 * | 7/2008 | Dorion ............... A47J 19/06 100/110 |
| 7,461,587 | B2 | 12/2008 | Guerrero |
| 7,601,374 | B2 | 10/2009 | Clarke |
| 7,604,826 | B2 | 10/2009 | Denisart et al. |
| D610,903 | S | 3/2010 | Shapiro et al. |
| 7,722,907 | B2 | 5/2010 | Roberts et al. |
| 7,748,561 | B2 | 7/2010 | Varriano-Marston et al. |
| D635,816 | S | 4/2011 | France et al. |
| D635,817 | S | 4/2011 | France et al. |
| D636,218 | S | 4/2011 | France et al. |
| D638,701 | S | 5/2011 | Shapiro et al. |
| D639,186 | S | 6/2011 | Shapiro et al. |
| D639,656 | S | 6/2011 | Shapiro et al. |
| 8,062,682 | B2 | 11/2011 | Mandralis et al. |
| 8,064,928 | B2 | 11/2011 | Venkatachalam |
| 8,092,848 | B2 | 1/2012 | Clarke |
| D653,495 | S | 2/2012 | France et al. |
| 8,226,999 | B2 | 7/2012 | Roberts et al. |
| 8,237,084 | B2 | 8/2012 | Varriano-Marston et al. |
| 8,302,528 | B2 | 11/2012 | Pawlick et al. |
| 8,549,996 | B2 | 10/2013 | Pryor et al. |
| 8,574,650 | B2 | 11/2013 | Turover et al. |
| 8,747,193 | B2 | 6/2014 | Bolte et al. |
| 8,828,463 | B2 | 9/2014 | Clark |
| 2002/0007155 | A1 | 1/2002 | Freund et al. |
| 2002/0020302 | A1 | 2/2002 | Heczko |
| 2005/0051478 | A1 | 3/2005 | Karanikos et al. |
| 2006/0156878 | A1 | 7/2006 | Faires et al. |
| 2007/0199453 | A1 | 8/2007 | Rasmussen et al. |
| 2008/0028943 | A1 | 2/2008 | Lee |
| 2008/0127994 | A1 | 6/2008 | Rippl et al. |
| 2008/0314261 | A1 | 12/2008 | Hensel |
| 2009/0022858 | A1 | 1/2009 | Pawlick |
| 2010/0050886 | A1 | 3/2010 | Obersteiner et al. |
| 2011/0076361 | A1 | 3/2011 | Peterson et al. |
| 2011/0297013 | A1 | 12/2011 | Sciamma |
| 2012/0021108 | A1 | 1/2012 | Baumann et al. |
| 2012/0307013 | A1 | 12/2012 | Hjalmarsson et al. |
| 2012/0321756 | A1 | 12/2012 | Estabrook et al. |
| 2013/0008322 | A1 | 1/2013 | Lee |
| 2013/0126370 | A1 | 5/2013 | Diliberto et al. |
| 2013/0209628 | A1 | 8/2013 | Turover et al. |
| 2013/0216663 | A1 | 8/2013 | Dogan et al. |
| 2013/0303064 | A1 | 11/2013 | Rusko et al. |
| 2014/0314918 | A1 | 10/2014 | Wettlaufer et al. |
| 2014/0377416 | A1 | 12/2014 | Clarke |

FOREIGN PATENT DOCUMENTS

| | | |
|---|---|---|
| CN | 201341424 Y | 11/2009 |
| CN | 102774028 A | 11/2012 |
| DE | 2801200 A1 | 7/1979 |
| DE | 3132358 A1 | 4/1983 |
| DE | 3413309 A1 | 10/1985 |
| DE | 3432774 A1 | 3/1986 |
| DE | 202005021174 U1 | 6/2007 |
| EP | 0060420 A1 | 9/1982 |
| EP | 0 122 968 A2 | 10/1984 |
| EP | 0242556 A1 | 10/1987 |
| EP | 0668148 A1 | 8/1995 |
| EP | 0824064 A1 | 2/1998 |
| EP | 1472156 A2 | 11/2004 |
| EP | 1632338 A2 | 3/2006 |
| EP | 1684619 A1 | 8/2006 |
| EP | 1784344 A2 | 5/2007 |
| EP | 1785369 A1 | 5/2007 |
| EP | 2062831 A2 | 5/2009 |
| EP | 2397286 A2 | 12/2011 |
| ES | 2302624 A1 | 7/2008 |
| FR | 2722731 A1 | 1/1996 |

(56) References Cited

FOREIGN PATENT DOCUMENTS

| | | |
|---|---|---|
| FR | 2767530 A1 | 2/1999 |
| FR | 2950357 A1 | 3/2011 |
| GB | 1 242 292 | 8/1971 |
| GB | 2 376 648 A | 12/2002 |
| GB | 2401810 A | 11/2004 |
| JP | S60-2155 A | 1/1985 |
| JP | S6024168 A | 2/1985 |
| JP | S62254856 A | 11/1987 |
| JP | H07313336 A | 12/1995 |
| JP | H10180144 A | 7/1998 |
| WO | WO 83/01268 A1 | 4/1983 |
| WO | WO 94/12040 A1 | 6/1994 |
| WO | WO 03/059778 A2 | 7/2003 |
| WO | WO 2005/051146 A1 | 6/2005 |
| WO | WO 2006/021405 A2 | 3/2006 |
| WO | WO 2006/111807 A1 | 10/2006 |
| WO | WO 2013/128004 A1 | 9/2013 |
| WO | WO 2013/132068 A1 | 9/2013 |

* cited by examiner

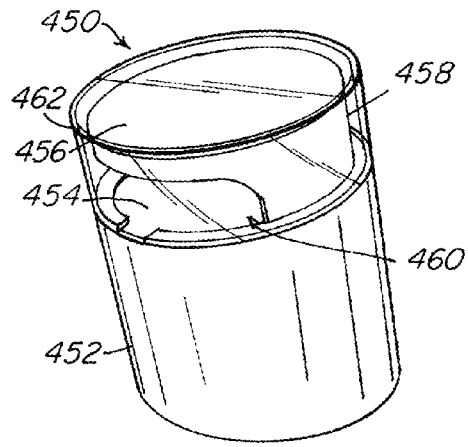
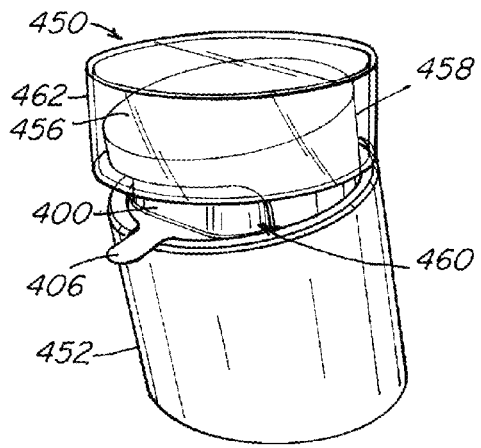
Fig. 11A
Fig. 11B
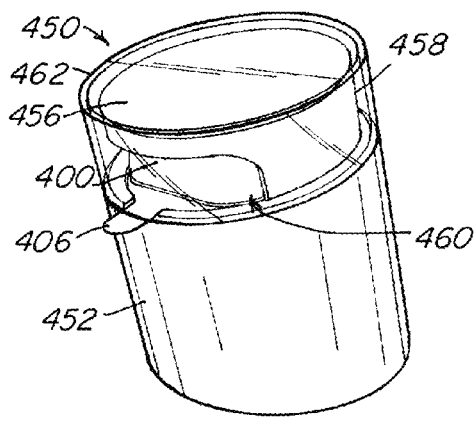
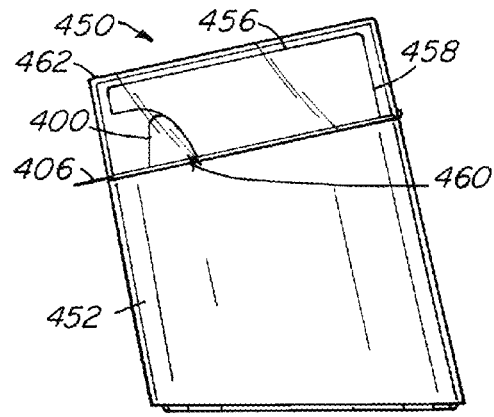
Fig. 11C
Fig. 11D
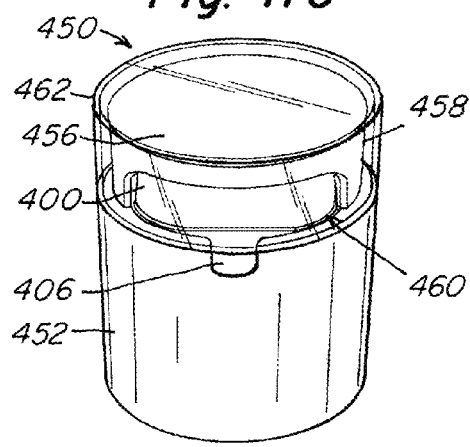
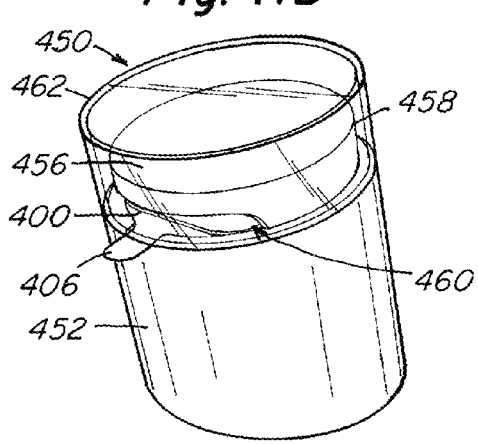
Fig. 11E
Fig. 11F

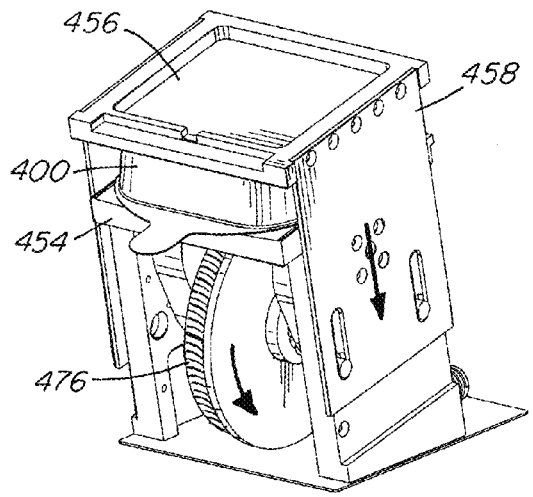 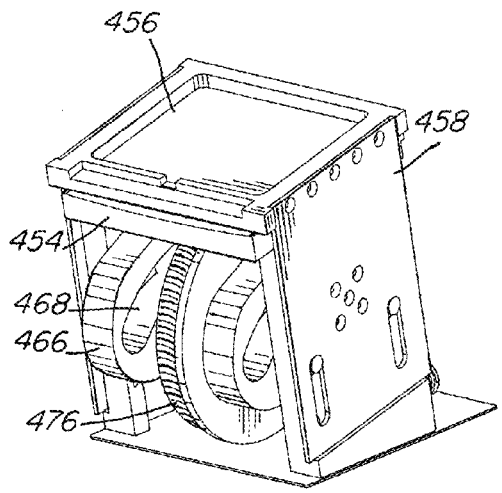
*Fig. 13A*  *Fig. 13B*
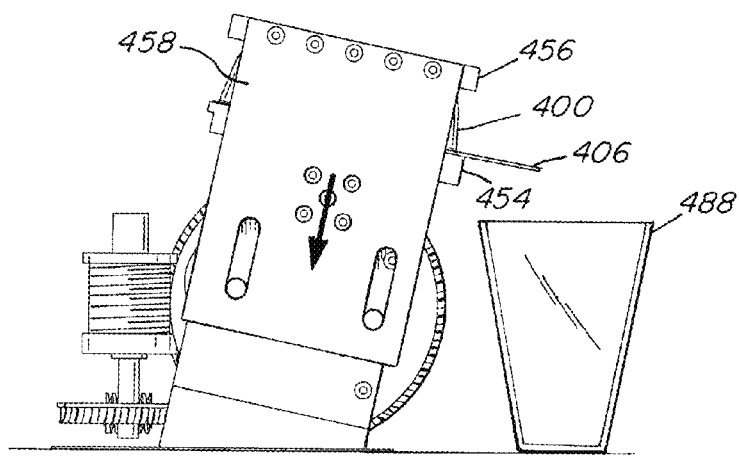
*Fig. 13C*

JUICING SYSTEMS AND METHODS

RELATED APPLICATIONS

This application is a continuation of International Patent Application Serial No. PCT/US2014/034676, filed Apr. 18, 2014, entitled "JUICING SYSTEMS AND METHODS, which claims the benefit of U.S. Provisional Application Ser. No. 61/962,316, filed on May 10, 2013, entitled "MODULAR CARTRIDGE-BASED JUICER SYSTEM AND METHODS THEREOF". Each of these are incorporated herein by reference.

FIELD

Disclosed embodiments are related to juicing systems and methods.

BACKGROUND

Devices for extracting fresh juice from food matter such as fruits and vegetables have been developed over the years for both home and commercial markets. Typical commercial juicers tend to be large, expensive, and are unsuitable for home or small retail environments. Systems more suitable for home and small retail environments have utilized several different methods for extracting juice from the food matter as described below.

In centrifugal-type juicers, food matter is fed through a chute, or other entrance, where a set of mechanical blades rotating at a high speed cut and/or grind the food matter to a pulp. Centripetal force is then applied by rapidly rotating the food matter to separate juice from the pulp through a filter. A second type of home and retail juicer is a masticating juicer which uses an auger to crush the food matter into a pulp. The resulting pulp is further compressed by the auger to extract juice through an associated filter. Another type of juicer is a hydraulic press juicer which typically uses a hydraulic press to compress food matter between one or more surfaces that are in direct contact with the food matter to extract the juice.

SUMMARY

In one embodiment, a juicer cartridge includes food matter as well as one or more liquid permeable compartments adapted and arranged to at least partially surround the food matter. A liquid impermeable compartment at least partially surrounds the one or more liquid permeable compartments. Further, compressing the juicer cartridge compresses the food matter to extract juice from the food matter. During juice extraction, the extracted juice flows from the one or more liquid permeable compartments to the liquid impermeable compartment and then from the liquid impermeable compartment to outside of the juicer cartridge.

In another embodiment, a juicer cartridge includes a plurality of compartments adapted to contain food matter. The plurality of compartments are adapted to be compressed by a juicer to extract juice from the food matter. An outlet is associated with the plurality of compartments. One or more filters are also associated with at least one of the outlet and the plurality of compartments. One or more seals are associated with at least one of the outlet and the plurality of compartments.

In yet another embodiment, a juicer cartridge includes a plurality of compartments adapted to contain food matter. The plurality of compartments are adapted to be compressed by a juicer to extract juice from the food matter. An outlet is also associated with the plurality of compartments.

In another embodiment, a juicer includes a region adapted to receive one or more juicer cartridges, and a pressing element adapted to apply pressure to the one or more juice cartridges. The region and the pressing element are adapted and arranged to dispense fluid extracted from the one or more juicer cartridges. The juicer also includes a temperature regulation element adapted to control a temperature of the one or more juicer cartridges.

In yet another embodiment, a juicer includes a region adapted to receive one or more compressible juicer cartridges including an outlet and containing food matter. The juicer also includes a pressing element adapted to apply pressure to the one or more juice cartridges. The region and the pressing element are adapted and arranged to dispense fluid extracted from the one or more juicer cartridges without the extracted fluid or food matter directly contacting the region or pressing element.

In another embodiment, a method of juicing food matter includes: positioning one or more juicer cartridges in a region of a juicer; arranging an outlet of the one or more juicer cartridges at a dispensing point of the juicer; applying a pressure to the one or more juicer cartridges using a pressing element to extract juice from food matter contained therein; and dispensing the extracted juice from the outlet without the extracted juice or food matter directly contacting the pressing element or region.

In yet another embodiment, a juicer cartridge that can be used in a juicer includes a sealed primary compartment, one or more membranes that can filter compressed food matter, and means for allowing the passage of liquid from the cartridge into the outside environment upon activation of the cartridge. Further, the juicer cartridge is adapted to be compressed in a juicer. In some embodiments, the sealed primary compartment further includes a plurality of secondary compartments. In certain embodiments, the secondary compartments each contain a quantity of food matter. Depending on the embodiment, the food matter is sized relative to at least one physical characteristic of the food matter such as, for example, at least one of water content, density, hardness, fiber content, and freshness. In some embodiments, the cartridge is substantially transparent.

In another embodiment, a juicer includes a means for compressing food matter held in a juicer cartridge and a housing defining a compartment for receiving the cartridge. Further, the cartridge further includes a sealed primary compartment, one or more filters, such as a membrane, that can filter compressed food matter, and means for allowing the passage of liquid from the container into the outside environment upon activation of the juicer cartridge. The means for compressing the food matter does not directly contact the food matter during extraction.

In yet another embodiment, a juicer cartridge includes a first compartment containing between about 0.03 kg and 0.6 kg of food matter. When the first compartment is compressed by an associated juicer, the food matter yields a ratio of juice volume to food matter mass that is between about 0.4 L/kg to 0.85 L/kg.

In another embodiment, a juicer includes a first pressing element and a second pressing element. The first pressing element and the second pressing element define a pressing chamber constructed and arranged to contain an associated juicer cartridge. The juicer also includes a drive constructed and arranged to displace the second pressing element towards the first pressing element. The drive is constructed and arranged to apply between about 6700 N to 35,600 N to the juicer cartridge during a final portion of the second pressing element displacement. The final portion of the second pressing element displacement corresponds to between about 3 mm to 13 mm of travel.

In yet another embodiment, a juicer includes a first pressing element and a second pressing element. The first pressing element and the second pressing element define a pressing chamber constructed and arranged to contain an associated juicer cartridge. The juicer also includes a drive constructed and arranged to displace the second pressing element towards the first pressing element. The drive is constructed and arranged to apply between about 7750 N to 44,500 N to the juicer cartridge during a final portion of the second pressing element displacement. The final portion of the second pressing element displacement corresponds to between about 5 mm to 20 mm of travel.

In another embodiment, a juicer includes a first pressing element and a second pressing element. The first pressing element and the second pressing element define a pressing chamber constructed and arranged to contain an associated juicer cartridge. The juicer also includes a drive constructed and arranged to displace the second pressing element towards the first pressing element. The drive is constructed and arranged to apply between about 8900 N to 53,400 N to the juicer cartridge during a final portion of the second pressing element displacement. The final portion of the second pressing element displacement corresponds to between about 9 mm to 30 mm of travel.

In yet another embodiment, a juicer cartridge includes a first compartment containing food matter and a second compartment. The first compartment is disposed in the second compartment. When the juicer cartridge is positioned within a pressing chamber of an associated juicer, a cross-sectional area of the second compartment is substantially equal to an area of a pressing surface within the pressing chamber. Additionally, prior to compression, a cross-sectional area of the first compartment is less than the area of the pressing surface.

In another embodiment, a juicer includes a first pressing element including a first pressing surface. The first pressing element is stationary. The juicer also includes a second pressing element comprising at least one sidewall and a top wall defining a second pressing surface. The at least one sidewall and the top wall define an open chamber with the first pressing element. The open chamber is sized and shaped to accept a juicer cartridge. A drive of the juicer is constructed and arranged to apply a force to the at least one sidewall that displaces the second pressing element towards the first pressing element.

In yet another embodiment, a juicer cartridge includes a compartment containing a volume of liquid. The compartment is constructed and arranged to be compressed by an associated juicer. The juicer cartridge also includes an outlet in fluid communication with the compartment. The outlet is constructed and arranged to extend out from the juicer such that at least a portion of the outlet is not compressed by the juicer.

In another embodiment, a juicer includes a first pressing element including a first pressing surface and a second pressing element including a second pressing surface. The first pressing surface and the second pressing surface define a pressing chamber constructed and arranged to accept an associated juicer cartridge. Additionally, at least a portion of the first pressing surface includes a concave surface.

In yet another embodiment, a juicer includes a first pressing element with a first pressing surface and a second pressing element with a second pressing surface. The first pressing surface includes a plurality of grooves that provide a first pressing area that is larger a first projecting area of the first pressing surface.

In another embodiment, a juicer cartridge includes a first compartment containing food matter and a second sealed compartment. The first compartment is disposed within the second compartment. Additionally, the second compartment contains a gas volume that is sufficient to space at least a portion of the second compartment from the first compartment.

In yet another embodiment, a juicer cartridge includes a first compartment constructed and arranged to contain food matter. The first compartment is constructed and arranged to be compressed by a juicer to extract juice from the food matter. The juicer cartridge also includes an outlet in fluid communication with the first compartment. The outlet includes a first layer located adjacent to a second layer, and the first layer and the second layer cooperate to form a valve. Fluid flow during active compression by the juicer during juice extraction opens the valve.

In another embodiment, a method includes: reading an indicator on a cartridge containing food matter; retrieving information related to the cartridge using the indicator; and at least one of controlling an operation of an appliance based on the retrieved information and/or capturing user behavior using the retrieved information.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various nonlimiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 11A is a schematic perspective view of a juicer;

FIG. 11B is a schematic perspective view of a juicer cartridge being inserted into a juicer;

FIG. 11C-11E are schematic perspective views of a juicer cartridge located within a juicer;

FIG. 11F is a schematic perspective view of a juicer cartridge being compressed by a juicer;

FIG. 13A is a schematic perspective view of a juicer prior to compressing an associated juicer cartridge;

FIG. 13B is a schematic perspective view of a juicer after actuation;

FIG. 13C is a schematic side view of a juicer with a juicer cartridge positioned therein and an associated glass;

DETAILED DESCRIPTION

Figure 1:
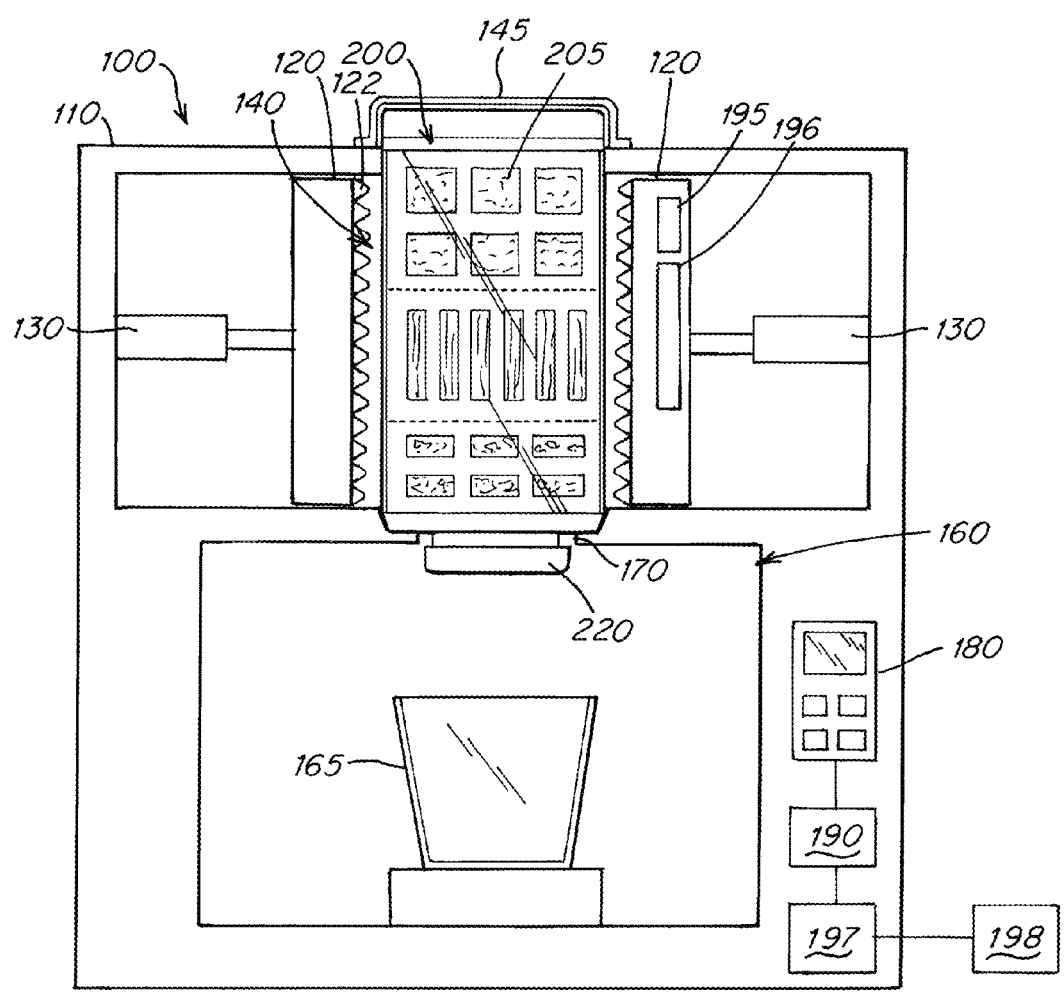
FIG. 1 is a schematic representation of one embodiment of a juicer with a loaded juicer cartridge.

The inventors have recognized drawbacks related to the use of typical juicers such as centrifugal juicers, masticating juicers, and typical press juicers. More specifically, these types of juicers are exposed to food matter and extracted liquids during use. Due to the use of complex mechanisms within these juicers, crushed and/or pulped food matter left after juice extraction may become entrapped in the machinery of these juicers, making cleanup difficult. If not completely cleaned, undetected food matter left behind within a juicer may become a food safety hazard. In addition to difficult clean up, the metal blades of centrifugal juicers, and to a lesser extent the auger of masticating juicers, may impart heat to the food matter during processing. Studies have shown that the heat introduced during this type of juicing can kill off desirable nutrients and/or organic compounds, making the juice less healthy. Centrifugal juicers also tend to be noisy.

In view of the above, the inventors have recognized numerous benefits associated with a juicer system capable of overcoming one or more of the above noted and/or other disadvantages associated with prior systems. For example, the inventors have found that delivering fresh juice from food matter while minimizing and/or eliminating contact between the juicer and the associated food matter and/or extracted juice may be advantageous. Minimizing or eliminating contact with the extracted juice and food matter may help to reduce, or possibly eliminate, complex and messy cleanup associated with using a juicer in addition to improved sanitary conditions. The inventors have also recognized that in some instances it is desirable to impart minimal heat to the food matter during processing to help retain the health benefits associated with the extracted juice.

In one embodiment, a juicer may be adapted and configured to receive one or more juicer cartridges containing food matter, such as fruits or vegetables, or other types of edible products as will be described below. For example, the juicer might include a region to receive the one or more juicer cartridges. The juicer may then dispense servings of juice by interacting with the one or more juicer cartridges containing food matter. In one embodiment, the juicer may extract juice from the juicer cartridges by compressing the juicer cartridges with a pressing element such as one or more displaceable platens. Alternatively, other ways of applying pressure to a juicer cartridge including, for example, rollers, a sphincter, a twisting mechanism, a roll up mechanism, a vacuum mechanism, a vibration mechanism, a centrifugal arrangement, an auger, or any other appropriate mechanism might be used as the disclosure is not so limited. Depending on the embodiment, juice may be delivered from an outlet of the cartridge without directly contacting the juicer, thus avoiding contamination of the juicer during use. However, juice may also be delivered such that juice does contact a portion of a juicer prior to being dispensed as the disclosure is not so limited. In view of the above, a juicer can provide one or more servings (e.g., a single serving) of freshly squeezed juice with minimal effort and minimal mess.

As noted above, exposing food matter to high temperatures may impact the nutritional value of juice extracted from that food matter. In other cases, the food matter might be at too low a temperature for optimal juice extraction. Consequently, in some embodiments, it may be desirable to include one or more temperature regulation elements capable of controlling a temperature of one or more juicer cartridges located within a corresponding juicer. The one or more temperature regulation elements may either selectively cool and/or heat the food matter contained within a juicer cartridge to a desired temperature and then maintain it at that temperature during juice extraction. This might be accomplished in any number of ways including active heating elements, refrigeration or other cooling elements such a peltier chip, passive heating systems such as baffles exposed to an airflow, or any other appropriate heating or cooling system. Additionally, the one or more temperature regulation elements may be located within any appropriate portion of a juicer. For example, one or more temperature regulation elements might be located in a pressing element of a juicer or they might be located on another surface within a region adapted and configured to contain the one or more juicer cartridges.

In another embodiment, a juicer cartridge for use in a corresponding juicer, may include one or more internal compartments associated with an outlet of the juicer cartridge. In some embodiments, the one or more internal compartments may be separated from one another and/or the outlet by one or more filters, such as one or more porous filtering membranes. The one or more internal compartments of the juicer cartridge may also be loaded with food matter and adapted such that the juicer cartridge can be compressed by a corresponding juicer to expel extracted juice through the outlet. Depending on the embodiment, the outlet and/or the one or more internal compartments may be sealed until activation. For example, the one or more seals may be pressure burstable seals and/or seals that may be pierced or cut by a corresponding mechanism on a juicer.

In some embodiments, a juicer cartridge may be a single pouch with compartments formed therein. In other embodiments, a juicer cartridge may correspond to a liquid permeable pouch at least partially contained within a liquid impermeable pouch. For example, a liquid permeable compartment arranged and adapted to contain a liquid containing food matter may be formed from an appropriate filter material such as a filtration membrane, a nonwoven filtration material, a filtration mesh, or other appropriate material. Depending on the embodiment, the liquid permeable compartment may completely, or partially, surround the food matter. The corresponding liquid impermeable compartment may then be arranged such that it at least partially, or completely, surrounds the liquid permeable compartment. When the juicer cartridge is compressed, both the inner liquid permeable compartment and the outer liquid impermeable compartment are compressed. Correspondingly, the food matter contained therein is also compressed resulting in juice extraction. The extracted juice may flow from the liquid permeable compartment through the filter material and into the liquid impermeable compartment. The liquid may then flow to outside of the juicer cartridge through any appropriate outlet.

In embodiments in which juice is extracted from food matter contained in multiple separate compartments, it may be beneficial to combine the extracted juice into a single stream dispensed through an outlet. In one such embodiment, multiple internal compartments may be associated with a single outlet. These compartments may also be in fluid communication with a combining chamber, which can be formed as a channel, or other appropriate structure, in fluid communication with the outlet. Depending on the embodiment, the multiple internal compartments may either be in direct fluid communication with the combining chamber, or they may be connected to the combining chamber through one or more secondary channels. In view of the above, juice extracted from food matter located within the multiple compartments may flow from the compartments into the combining chamber where these separate flows of liquid may be combined and/or mixed and subsequently dispensed through the outlet as a single stream. Depending on the embodiment, mixing features such as helical vanes, features to induce turbulent flow, or other appropriate structures may be located within the combining chamber to aid in mixing the separate flows of liquid.

In some instances, it may be desirable to prevent liquid dripping from an outlet of a juicer cartridge and/or contamination entering the juicer cartridge prior to juice extraction. Consequently, in some embodiments, an outlet of a juicer cartridge may be sealed prior to activation. The seal may either be a pressure burstable seal, a peel away seal that is manually removed prior to usage, or a seal capable of being pierced or cut either manually or by a mechanism on a corresponding juicer. It should be understood that other types of seals might also be used. In addition to incorporating a seal, the outlet may also incorporate drip proof features to avoid dripping after juice extraction. Appropriate drip proof features may include a valve, a capillary, deformable materials capable of being deformed to a closed position, absorbent materials located within the outlet, a retractable outlet or spout, a zipper like closure, a pressable mechanical seal, sticker labels applied to the outlet, spray or surface treatments (e.g. a hydrophobic coating applied to an inner surface of the outlet), or any appropriate geometry, feature, structure, or component capable of reducing or eliminating dripping after juice extraction. In addition to various features associated with the outlet which may help prevent dripping, in some embodiments after juice extraction, the pressing elements, or other pressing device, may be opened slightly, or otherwise operated, such that the force applied to the pulp is reduced. This reduction in applied force results in the pulp expanding from a first smaller volume to a second larger volume. The volume expansion will apply a suction to juice located within the outlet, and will draw juice located within the outlet back into the juicer cartridge interior.

In some embodiments, it may be desirable for a juicer cartridge to protect the food matter contained therein from being compressed prior to juice extraction. Without wishing to be bound by theory, at least one of the benefits associated with avoiding compression of the food matter prior to juice extraction is preventing the premature purging of juice from the flesh of the produce. Preventing purging of juice prior to extraction may also extend the shelf life of the product since the food matter is not exposed to liquid which may accelerate degradation of the food matter. In view of the above, in some embodiments, a juicer cartridge may be constructed and arranged to collapse within a juicer during juice extraction while providing sufficient structural strength to prevent inadvertent collapse of the juicer cartridge during processing and handling outside of the juicer. While any appropriate cartridge with an appropriate strength may be used, in some embodiments, the juicer cartridge may be constructed and arranged to survive the equivalent of a five foot drop onto the ground. This drop distance, may be equivalent to someone dropping a juicer cartridge from a counter, or a shipping box getting crushed. In addition to the above, a juicer cartridge may be constructed and arranged such that multiple juicer cartridges can be stacked on one another during shipping without crushing the juicer cartridges.

By optimizing juice extraction for each type of food matter contained within a juicer cartridge, it may be possible to avoid under or over extraction of the different types of food matter. Therefore, in some instances, it may be desirable for the different types of food matter contained within a juicer cartridge to be presized according to various physical characteristics. More specifically, in some embodiments, the separate types of food matter may be individually sized such that juice extraction may be completed from each type of food matter at substantially the same time. The sizing of different types of food matter may be selected based on physical characteristics such as water content, density, hardness, fiber content, freshness, and other appropriate characteristics. Without wishing to be bound by theory, smaller food matter sizes will result in increased surface area and thus increased juice extraction for a given pressure. Therefore, food matter that is more difficult to obtain juice from due to characteristics such as decreased water content and increased hardness may have smaller sizes than softer food matter with larger water content.

Depending on the embodiment, food matter contained in separate compartments of a juicer cartridge may be filtered individually. Embodiments incorporating individual filters for each compartment may offer several benefits. For example, the filters associated with each compartment may be selected based on physical characteristics of the food matter contained therein. These characteristics may include such things as: fiber content; cut size of the food matter; removal of seeds and shell fragments; and other appropriate physical characteristics. By selecting filters based on the above noted physical characteristics, a desired flow rate of the extracted juice, a desired amount of pulp or fiber in the extracted juice, desired taste, texture, bitterness, mouth feel, and other possible benefits may be obtained. While embodiments including individual filters are discussed above, embodiments in which the compartments are filtered together through a single filter are also possible.

In one embodiment, a juicer cartridge may include both wet and dry ingredients that are combined during juice extraction by a juicer. In one such embodiment, a dry ingredient may be disposed within a first compartment of the juicer cartridge and a liquid, or liquid containing food matter, may be disposed within a second compartment of the juicer cartridge. The second compartment of the juicer cartridge may be associated with the first compartment such that during juice extraction in a corresponding juicer, liquid may flow from the second compartment to the first compartment where the liquid may be combined with the dry ingredient. The dry ingredient may either be suspended within the liquid, or it may be dissolved within the liquid, as the disclosure is not so limited. After combining the ingredients, the combined mixture may then flow from the first compartment through an outlet of the juicer cartridge. In addition to combining the dry ingredient and liquid, in some embodiments, one or more mixing features may be located in either the first compartment or a channel associated with the first compartment to aid in combining the dry ingredient and liquid. Appropriate mixing features may include helical vanes, features to induce turbulent flow, or other appropriate structures. The first and second compartments may either be separate, or one may be contained within the other as the current disclosure is not so limited. For example, the second compartment might correspond to a burstable pouch or tablet containing a gel, powder, dissolvable substance, or other desired material located within the first compartment. In such an embodiment, the second compartment may burst to permit mixing of the liquid with the dry ingredient. Alternatively, a crushable material or tablet may be located within a compartment such that it is crushed and mixed with the juice during extraction. Other possible arrangements for combining a dry ingredient with a liquid within the juicer cartridge are also contemplated. For example, while a compartment containing a burstable pouch has been described, in some embodiments a reservoir containing the burstable pouch, tablet, and/or dissolvable material is located along a flow path of the juicer cartridge, such as, for example, within the outlet or spout of a juicer cartridge. Possible ingredients that may be delivered in the ways described above include, but are not limited to, flavorings, additives, and dietary supplements such as protein supplements, vitamins, extracts, minerals, dried fruits, dried vegetables, nuts, herbs, freeze dried oils, spices, alcohol, and any other desired consumable substance.

In some instances, a user may desire to compost food matter contained within a juicer cartridge and recycle the juicer cartridge itself. In such an embodiment, a juicer cartridge may be adapted and arranged to be opened after juice extraction. Depending on the embodiment, peel-able films, scored opening areas, removable sticker labels, or any other appropriate arrangement capable of removing the food matter within a juicer cartridge after juice extraction may be used to give access to the inner contents of a cartridge. Consequently, juiced food matter contained within the juicer cartridge may be removed for composting and the remaining portions of the juicer cartridge may be recycled or otherwise disposed of.

In some embodiments, it may be desirable for a juicer cartridge to incorporate features to extend its shelf life and reduce nutrient loss of food matter contained therein. One possible way to increase shelf life may include filling a juicer cartridge with an inert gas that is substantially non-reactive with the food matter following loading and/or vacuum packing. Suitable inert gasses include nitrogen, carbon dioxide, argon, and/or any other gas capable of reducing oxidation, moisture loss, nutrient loss, or degradation of the food matter as compared to normal air. In other embodiments, a juicer cartridge may include features to allow respiration of food matter and other ingredients contained therein to help prevent degradation of the food matter during storage. This might be accomplished in any number of ways including, but not limited to, use of breathable materials such as appropriately treated polymer or cellulose based films and meshes. Appropriate treatments include, but are not limited to perforations, coatings, impregnation with materials, as well as vents and/or holes formed in the juicer cartridge.

In certain embodiments, it may be desirable to provide an appliance associated with a food matter containing cartridge with "smart" functionality. This may be used to provide benefits including, but not limited to, safety features, track usage, and enhance operator experience. For example, an appliance, such as a juicer, might include a reader, such as a camera or RFID reader, capable of reading information from a juicer cartridge through the use of printed or digital indicator technologies such as radio frequency identification devices (RFID), barcodes, quick response codes, magnetic strips, magnetic inks, carbon black inks, invisible inks, a color bar or other similar graphic, and other readable medium. The information provided by the juicer cartridge might include information such as expiration of contents, cold chain information, ingredients, allergy information, nutrition information, ingredient information, consumption and calorie contents, authorization information, counterfeiting information, and security information and other pertinent information. If desired, a juicer may also upload all, or some, information acquired from the juicer cartridge to a computer or server. For example, a person may wish to track their nutrition intake for medical, dietary, or personal reasons. Consequently, a person might upload the types of juices as well as their nutritional and caloric intake to a cloud-based system that they might access from anywhere. Alternatively, they might upload it to another party, or to a service accessible to another party, such as an insurance company, a doctor, a personal trainer, or any other appropriate party. For example, the uploaded information might be used to automatically place an order for replacement juicer cartridges based on a preset par of juicer cartridges for a person or device (refrigerator or vending machine) and the uploaded cartridge usage information. The uploaded information may also be used for sharing of beverage consumption, health information through social media, and diet coaching to name a few.

In addition to the above, in some embodiments, a juicer is also capable of downloading information from a remotely located server, cloud service, or computing device. For example, after reading identifying information on a juicer cartridge (e.g. a bar code), the juicer can download information related to that cartridge such as safety information, ingredient information, recall data, or any other desired information.

In some embodiments, a juicer may simply read information provided by the juicer cartridge. In other embodiments, a juicer might actively measure juicer cartridge storage conditions and expiration using appropriate methods. Possible storage conditions that might be determined by a juicer include, but are not limited to, temperature, humidity, pressure, oxygen content, carbon dioxide content and/or radiation exposure. For example, gases located within a cartridge may be sampled by a juicer and analyzed to determine if a food safety condition exists. Alternatively, more passive technologies such as temperature sensitive indicator such as a temperature sensitive paint, ink, or enzymatic cold chain indicators might be used to determine if the cartridge has been stored above a threshold temperature. In some embodiments, the temperature sensitive indicator is tuned such that it indicates that the cartridge has been stored above a threshold temperature after 1 hour, 2 hours, 3 hours, 4 hours, or any other appropriate time period. However, embodiments in which a lower cost temperature sensitive indicator that changes immediately upon exposure to a threshold temperature is used are also contemplated. In the above embodiments, a juicer may include a sensor capable of detecting if a temperature sensitive indicator has been activated by sensing a color or graphic change. Based on safety and expiration information obtained from the juicer cartridge, a juicer may either prevent or permit juice extraction. The juicer may also include a user override that permits juice extraction to proceed as might be desired for a juicer cartridge that was previously frozen and is being used past an expiration date indicated on the juicer cartridge.

It should be understood that the above noted methods and modes of operation of a juicer are also generally applicable to any appropriate appliance. For example, these methods and modes of operation might be applied to a beverage dispensing appliance, a food preparation appliance, and/or a food storage appliance. In one embodiment, the appliance is a juicer. In other embodiments, the appliance may be a refrigerator, vending machine, microwave, and other appropriate appliance. For example, an appliance may include an appropriate reader capable of reading an indicator on a cartridge containing one or more types of food matter such as fruit, vegetables, greens, meat, dairy, oils, grains, prepared dishes, or any other type of food matter. As noted previously, the indicator may either be a digital or visual indicator as the disclosure is not so limited. Depending on the particular embodiment, the reader may correspond to at least one of a camera integrated with the appliance and a digital reader such as a RFID reader integrated with the appliance. Alternatively, a separate device such as a smart phone, or other appropriate device, may be used to scan the indicator and either upload the scanned information to a remotely located server that then connects to the appliance, or the separate device may communicate directly with the appliance over a wired connection or a wireless connection, such as a Bluetooth connection.

After reading the indicator, the appliance then retrieves information related to that cartridge using the indicator. Depending on the particular application, the appliance then either controls an operation of the appliance based on the retrieved information and/or the appliance captures user behavior using the retrieved information. The information retrieved by the appliance may be retrieved in any number of ways. For example, in one embodiment, the indicator directs the appliance to connect to a remotely located server, or computing device, in order to retrieve the desired information. In such an embodiment, the appliance may both upload and/or download information from the remotely located server or computing device. Alternatively, in other embodiments, the appliance includes a database that is updated regularly (e.g. daily, weekly, monthly, or any other appropriate time frame) from a remotely located server or computing device. Consequently, when the indicator is read by the appliance, the desired information is then retrieved from the database. While in some embodiments the database is regularly updated, embodiments in which the database is not updated our also contemplated.

Depending on the particular application, the appliance may perform one or several operations in response to the retrieved information. In one embodiment, the retrieved information is used to control an operation of the appliance. In another embodiment, the retrieved information is used to capture user behavior. Additionally, an appliance may do both of the above. For example, if the retrieved information relates to food safety such as expiration dates, recalls, ingredients versus known user allergens, authorization information, counterfeiting information, and security information the appliance may either lock out operation of the appliance or it may notify a user of the detected condition depending on the particular type of appliance. Alternatively, the appliance might display nutritional information to a user or it may upload that information to a remotely located server or social networking site, e-mail the information to a predetermined individual, or other applications as noted previously. In instances where the appliance is tracking user behavior, the retrieved information may be used to track the type of cartridge a user is using as well as the consumption of the cartridges that an individual, or appliance, has used. This information may be used for several purposes. For example, depending on the types of cartridges that a user has used, different types of cartridges that the user may like can be recommended to the user for purchase. Additionally, by tracking the consumption of cartridges, automatic re-ordering and stocking of these cartridges can be facilitated when the tracked number of cartridges falls below a preset par value defined by the user. Of course other applications are also possible.

For the sake of clarity, the juicer cartridges and juicer systems described herein generically refer to the use of food matter from which juice may be extracted. However, it should be understood that the food matter used in both the juicer cartridges and juicer systems may correspond to any appropriate food matter. For example, food matter may include such nonlimiting items as: fruit; vegetables; meat; fish; plant matter; flavorings; dietary supplements such as vitamins, protein powders, ginseng; and/or any other ingestible product that might be desirably included in a beverage.

Turning now to the figures, several specific nonlimiting embodiments are described in more detail. For the sake of clarity, certain features are described with regards to a particular embodiment. However, it should be understood that the various features and embodiments depicted in the figures and described herein may be combined in any appropriate fashion as the disclosure is not so limited.

FIG. 1 depicts one exemplary embodiment of a juicer 100 configured to receive a juicer cartridge 200 containing food matter 205. In exemplary embodiments, juicer 100 can include a region 140 such as a recess, chamber, or other appropriate cartridge receiving compartment, constructed and arranged in the housing 110 to receive one or more juicer cartridges. It should be understood that region 140 may be sized and/oriented to receive any number of juicer cartridges 200 as the disclosure is not so limited. However, for ease of illustration, the region 140 is, at times, shown and/or described with a single cartridge. The juicer may also include an outlet 170 associated with an outlet 220 of the juicer cartridge 200. In some embodiments, the region 140 may define a chamber that can include a lid 145 that can be locked or sealed when the juicer is in operation. For example, lid 145 may be automatically locked and/or unlocked in response to a signal from the electronics of juicer 100. However, embodiments in which the lid may be manually locked and/or unlocked are also contemplated.

Referring again to the figures, a juicer 100 may include an exterior housing 110 containing electronics and mechanical components. The juicer 100 may also include one or more platens for applying pressure to a juicer cartridge. For example, as depicted in the figures, a pair of opposing platens 120 may be used to apply a force to one or more juicer cartridges 200 filled with food matter 205. Depending on the embodiment, each of the platens 120 may be attached to an arm 130. Arms 130 may be further connected to a system capable of imparting force to the opposing arms 130 and platens 120 thereby generating the desired compressive force between platens 120. This force may be provided using any appropriate mechanism including, but not limited to, a pneumatic system, a hydraulic system, an electromechanical system such as a servo motor or a stepper motor, or any other appropriate system capable of delivering a desired pressure and/or force to a juicer cartridge. Additionally, in one embodiment, the juicer 100 may be an electrically powered tabletop appliance. However, it should be understood that the juicer may be powered using any appropriate power source including a power line, battery, generator, a pneumatic pressure source, a hydraulic power source, or any other appropriate power source as the disclosure is not so limited.

The compressive force applied to a juicer cartridge 200 may be transmitted to the food matter 205 contained therein to extract liquid (e.g. juice) from the food matter 205. The extracted juice 201 may then flow from within the juicer cartridge 200 through the juicer cartridge outlet 220 and the juicer outlet 170 to an exterior of the juicer. In some embodiments, a juicer 100 may have a dispensary area 160 where juice may be dispensed from. For example, as depicted in the figures, a dispensing area 160 may be embodied by a region defined in the face of housing 110, and may further include a shelf and/or drip tray for receiving and supporting a server container 165. In some embodiments, and as depicted in the figures, the outlet 170 of the juicer may be formed within the dispensing area 160 of the housing 110. Therefore, the extracted juice 201 flowing out of the outlet 170 may be dispensed into a serving container 165 with minimal cleanup. Depending on the particular embodiment, juice 201 being dispensed through the juicer outlet 170 may, or may not, come into direct contact with the outlet 170 of the juicer. For example, in some embodiments the juicer cartridge outlet 220 may extend beyond the corresponding region, pressing elements, and other portions of the juicer to facilitate the extracted juice not coming into contact with any portion of the juicer during use.

It should be understood that the one or more platens 120 may be constructed and arranged in any number of ways. For example, in one embodiment, the one or more platens 120 are sized to correspond to an approximate size of a juicer cartridge 200 when compressed by the platens during juice extraction. Additionally, the one or more platens 120 may be formed from any appropriate material including, but not limited to, stainless steel, ceramic, plastic or any other material. The surfaces of the platens may also be coated with non-stick materials and/or materials with antimicrobial properties such as silver plating, silver nanoparticle, and silver coated surfaces, though other surface coatings might also be used. The face of each platen 120 may also optionally be formed with grooves 122 on opposing faces of the platens and/or other shapes that can be used to facilitate the generation of pressure on cartridge 200 and/or improve handling of cartridge 200. For example, grooves 122 on the two platens may be nested together (i.e. the peaks and valleys of each platen may be positioned within each other). However, embodiments in which the platens do not nest together are also contemplated. Additionally, the grooves may provide an increased pressing surface area. More specifically a surface area along the grooves is greater than a projected area of the pressing surfaces. The grooves may either be sharp peaks, rounded peaks sinusoidal, square, or have any other appropriate shape. Alternatively, in another embodiment, at least one of the platens may have a concave curvature. The other platen may either be flat, have a concave curvature, a convex curvature, and/or a complementary shape in such an embodiment. Without wishing to be bound by theory, such an arrangement may provide an increased compression to the outer perimeter of the food matter located between the platens which further enhances juice extraction by helping to contain the food matter within the center of the platen and guide juice extraction.

Depending on the embodiment, a juicer may apply between about 6,700 N to 35,600 N (1500 pounds of force to about 8000 pounds) of force to a juicer cartridge during the approximately final 3 mm to 13 mm (0.1 inches to 0.5 inches) of movement of the pressing platens, or other appropriate pressing elements used to extract juice from the juicer cartridge. In some embodiments, the applied force during this final movement of the pressing platens, or pressing elements, is about 17,800 N to about 26,700 N (4000 pounds to about 6000 pounds). In addition to applying the above noted forces during the final amount of travel, the platens, or other appropriate pressing element, may have a total travel of about 38 mm (1.5 inches) and may have a gap between about 4 mm to about 9 mm (0.15 inches to about 0.35 inches) between the platens, or other pressing elements, after being displaced to extract juice from the fruit matter located within the juicer cartridge. It should be understood that while particular dimensions and forces are noted above with regards to a specific embodiment of a juicer, any appropriate combination of forces, distances of force application, total platen travel, and gaps might be used as the disclosure is not so limited. The force ranges and displacements noted above are directed to an appliance sized for consumer applications. Appropriate forces and displacements for use in larger appliances for use in office, corporate, restaurant, and or food service settings are described in more detail below.

In addition to the possible ranges of applied force, a juicer may apply at least 60 psi to a surface of a juicer cartridge during juice extraction. Further, in some embodiments, a juicer may apply between about 80 psi to about 100 psi to a surface of a juicer cartridge during the final distances of platen displacement as noted above. However, it should be understood that other pressures might be applied by a juicer as the disclosure is not so limited.

Figure 2:
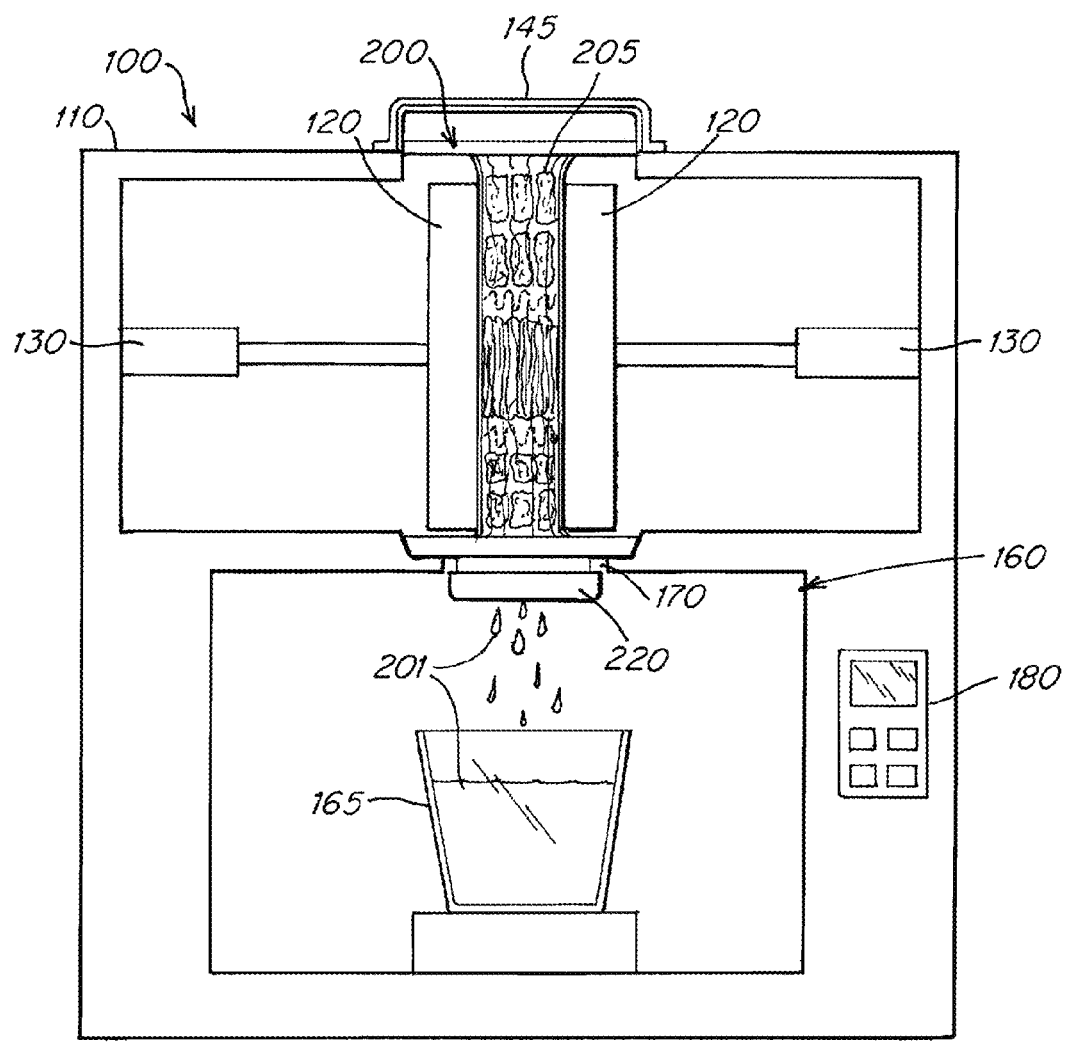
FIG. 2 is a schematic representation of the juicer and juicer cartridge of FIG. 1 after pressing.

While the one or more platens 120 have been depicted as being actuated in a horizontal direction to apply a compressive force to a juicer cartridge 200, the disclosure is not so limited. Instead, it should be understood that a compressive force may be applied to the juicer cartridge 200 in any appropriate direction. For example, the compressive force might be applied in a vertical direction. Additionally, pressure may be applied to the juicer cartridge in any appropriate manner including a single platen, rolling mechanisms, application of pressure to only a portion of the juicer cartridge, and other appropriate methods of applying pressure to a juicer cartridge to extract liquid from the food matter contained therein. For example, in one embodiment, a single platen might be used to compress a juicer cartridge 200 against an opposing surface. This opposing surface may be fitted with a hole for receiving the outlet 220 of cartridge 200, or the outlet might be received in another adjacent surface similar to the embodiment depicted in FIGS. 1 and 2. In another embodiment, multiple juicer cartridges, or pouches, might be located between the platens such that pressure is applied to all of the cartridges at once during juice extraction. In yet another embodiment, a juicer may include more than two platens where a corresponding plurality of juicer cartridges may be located between the more than two platens. For example, a first juicer cartridge may be located between a first and second platen and a second juicer cartridge might be located between a third and fourth platen. Alternatively, the second juicer cartridge might be located between the second platen and a third platen.

In some embodiments, one or more juicer cartridges are horizontally or vertically stacked within a juicer. The juicer cartridges may also include food matter that is not equally distributed across the surface of the juicer cartridge. In either case, a juicer may apply pressure to unequally distributed food matter across a pressing surface such as a platen as noted above. To help mitigate this effect, in some embodiments, one or more juicer cartridges may include features to help orient the one or more juicer cartridges within the juicer. For example, the juicer cartridges and the corresponding region may have mating shapes and/or features to orient the juicer cartridges. For example, a centering flange located on an outermost perimeter of a juicer cartridge may be constructed and arranged to interface with a pressing platen or cavity that the juicer cartridge is disposed in. Additionally, in some embodiments, a juicer cartridge includes one or more features used to align two or more juicer cartridges that are stacked on each other. For example, the two or more juicer cartridges may be constructed and arranged such that they are mechanically interlocked when stacked together by any appropriate feature or combination of features. However, embodiments in which the juicer cartridges do not include features to align them when stacked, are also contemplated. The above noted features help to align the juicer cartridges within a juicer as well as helping to evenly position food matter relative to a pressing surface of the juicer.

When desired, the platen, or other appropriate surface, may be maintained at a desired temperature through the use of an appropriately configured and arranged temperature regulation element 196. In embodiments where cooling of the juicer assembly, and juicer cartridge contained therein, is desired, the temperature regulation element 196 may correspond to a refrigeration element which might be embodied by any number of appropriate devices including, but not limited to, thermoelectric materials such as peltier chips, a refrigeration assembly, and other conventional refrigeration techniques However, in embodiments in which a juicer cartridge 200 is stored at a temperature that is not optimal for processing by juicer 100 (e.g., frozen or in a cold refrigerator), the temperature regulation element 196 may correspond to a warming assembly capable of gently warming the juicer cartridge until a desired temperature is reached. Depending on the particular embodiment, the warming assembly might include heating elements and thermal sensors to raise a temperature of a juicer cartridge to a desired temperature while ensuring it does not exceed a preselected threshold temperature which could cause a loss of valuable compounds. In yet another embodiment, the temperature regulation element 196 may correspond to a passive cooling system. In such an embodiment, the temperature regulation element might utilize cooling techniques such as channeling air flow across a surface to draw away heat and introduce cooler air. In view of the above, it should be understood that the temperature regulation element, or elements, may correspond to any appropriate device or configuration capable of heating or cooling the juicer cartridge. For example, other possible embodiments for a temperature regulation element, include, but are not limited to, removable platens constructed and arranged to be placed in a freezer and/or heated on a stove, chemical activated heat and cold reactions, liquid cooled and/or heated platens using channels within the platens, induction heating, radio frequency friction heating, and ultrasonic frequency friction heating.

While a single temperature regulation element 196 integrated into a single platen 120 has been depicted in the figures, it should be understood that the disclosure is not so limited. Instead, multiple temperature relation elements might be used corresponding to either refrigeration elements, heater elements, passive cooling systems, and/or a combination of the above. Additionally, these temperature regulation elements might be incorporated into any appropriate surface contacting a juicer cartridge 200 during juice extraction. For example, a temperature regulation 196 element might be incorporated onto a surface, or an interior, of a platen 120. Alternatively, a temperature regulation element might be disposed on, or incorporated into, another surface in contact with a juicer cartridge. In some embodiments, a temperature regulation element might also be provided as a discrete component separate from the juicer cartridge region.

A juicer 100 may also be fitted with various electronic components and/or a control panel 180 for interacting with the operator of the device. Juicer 100 may include a controller 190 for controlling the control panel 180 and directing operation of the various components of the device (e.g., platens 120, arms 130, etc.) in response to operator input through the control panel 180. For example, an operator may insert a cartridge 200 into juicer 100 and activate the machine using the control panel 180. However, other means of operating the juicer including, for example, an on/off switch, are also possible. The above noted controller 190 may take the form of a system-on-a-chip (SoC) integrated circuit, a microcontroller, or any other configuration that may be known in the art. Depending on the embodiment, control panel 180 may include means for inputting operator selections and/or preferences as well as for communicating information to the operator. In exemplary embodiments, control panel 180 may take the form of an LCD touchscreen that provides the user with options and information including beverage types, user profiles, nutrition information, and the like. Juicer 100 can also be configured to interact with an operator's smart phone, tablet, or laptop by Bluetooth, WiFi, or other communications medium.

In order to control juice extraction and/or provide desired information, a juicer 100 may include one or more sensors 195 to monitor various control parameters. For example, a juicer might include temperature sensors, force sensors, pressure sensors, timers, displacement sensors, position sensors (e.g. a sensor for monitoring if the lid 145 is open or closed), or any other appropriate sensor. These sensors may be in electrical communication with the controller which may monitor the sensors. The controller may convey certain information about the device to the operator through the control panel 180. For instance, in one embodiment, a control panel 180 may display a temperature of a surface of one or more platens 120. Alternatively, and/or in addition to the above, a control panel 180 might display any diagnostic information or statistics relevant to the operation of the device such as, for example, a warning that servicing is due.

In some embodiments, it may be desirable to connect a juicer 100 to a standalone computer, a remotely server or computing device, and/or a network such as the Internet, a local area network, a wide area network, and the like. For example, a juicer 100 may connect to a remotely located server, computing device, or network 198 using any appropriate connection 197 which is in electrical communication with the controller 190. Appropriate connections may include, but are not limited to, WiFi, Bluetooth, Ethernet, RJ-45 modular connections, connections provided through house line voltage connections, and/or any other appropriate type of connection as the disclosure is not so limited. Through this external connection, an operator may be permitted to share information about juicing activity through social media and social networking sites such as Twitter, Facebook, MyFitnessPal, and the like. In such an embodiment, an operator may be provided with an option to post data concerning the contents of a juicer cartridge 200 to a desired social media and/or social networking site. The post may be pre-generated by the controller 190. Alternatively, a post may be manually generated or include options to input additional comments and information from the operator.

Depending on the embodiment, a juicer 100 may be preprogrammed to only receive approved cartridges. In such an embodiment, a controller 190 of the juicer 100 may examine a juicer cartridge inserted into cartridge compartment 140 for a particular indicator of authenticity such as a serial code, bar code, hologram, or any other means for indicating that the juicer cartridge is approved for use with the juicer.

In certain embodiments, various user profiles may be stored within a controller 190. In order to control the one or more profiles, prior to operating a juicer a user may log in using an identifier or PIN. Activity performed while a particular user is logged in may then be recorded to that user's profile. Additionally, reports may be generated and either stored and/or output for the user. A user profile may also contain information about the user, including specific dietary requirements, allergens, preferences, and settings.

In some instances, it may be desirable to display information related to a temperature of a juicer cartridge and/or to control operation of the juicer based on temperature information. Therefore, in one embodiment, one or more sensors 195, such as thermal sensors, may be used to monitor a temperature of the one or more juicer surfaces contracting a juicer cartridge 200. For example, a sensor 195 may be associated with a platen 120 or another surface compressing, or in contact with, a juicer cartridge 200. A temperature sensor 195 may either be disposed on top of a surface such that it is in direct contact with a juicer cartridge, or it may be embedded within a surface. It should be understood that other locations are also possible. The one or more sensors 195 may transmit temperature information to a controller 190. In turn, the controller 190 may display information received from the one or more thermal sensors on a control panel 180. Additionally, the controller may control one or more components of juicer 100 in response to the information from the one or more thermal sensors. For example, the controller may direct platens 120 to operate at a slower rate to reduce friction and heat. Alternatively, a temperature of a surface contacting a juicer cartridge (e.g., platens 120) may be maintained within a specific temperature range such that degradation of organic compounds in food matter may be reduced by minimizing exposure to too high or too low a temperature, which can result in a less healthful juice product. In one embodiment, a juicer cartridge may be maintained between 32° F. and 43° F. In some embodiments, the juicer cartridge may be maintained at or near 32.5° F. However, it should be understood that other temperatures are also contemplated.

Figure 3A:
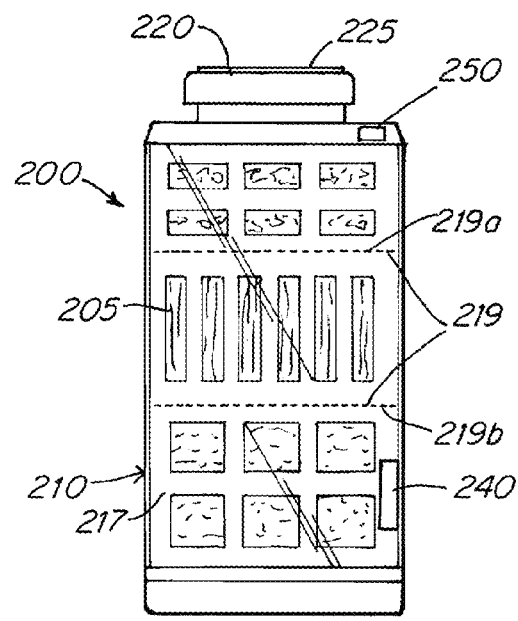
FIG. 3A is a schematic representation of one embodiment of a juicer cartridge.
Figure 3B:
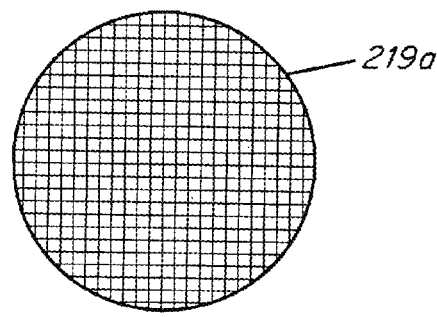
FIGS. 3B-3C are schematic representations of exemplary filters located in the juicer cartridge of FIG. 3A.
Figure 3C:
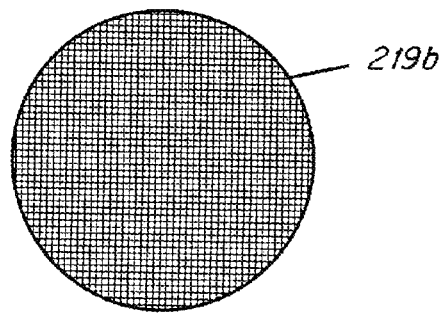

Referring now to FIGS. 3A-3C, an exemplary embodiment of a juicer cartridge 200 is described. As depicted in the figure, a juicer cartridge 200 may include an outer shell 210. Cartridge 200 may also include an outlet 220 positioned at a distal end of juicer cartridge 200. The outlet 220 may provide fluid communication between an interior of the juicer cartridge 200 and an outside environment exterior to the cartridge. The outer shell 210 may be made from any appropriate suitable material capable of providing desired design criteria such as sufficient structural integrity, protection from the outside environment, and tamper resistance. Further, in some embodiments, the outer shell may be made from a biodegradable material including, but not limited to, biodegradable plant-based polymers such as cellulose, cellophane, or polylactic acid.

In some embodiments, outlet 220 may include a seal 225. The seal 225 may be in a closed configuration at the time of manufacturing and delivery. Subsequently, the seal may be opened by an operator or by a corresponding juicer during operation. For example, in one embodiment, a seal 225 may be embodied by a foil seal, a removable plug, a perforated section of outer shell 210, or any other suitable means of providing an operator removable seal. In such an embodiment, the seal may be manually removed by a user prior to juice extraction. This seal removal may either be performed prior to placing a juicer cartridge in a juicer, or after placing the juicer cartridge in the juicer as the current disclosure is not so limited. Alternatively, in some embodiments, the seal 225 may be opened by an appropriate opening mechanism such as: a needle adapted to pierce the seal; a cutting element adapted to cut through the seal or an associated portion of the outlet; or any other appropriate mechanism capable of either opening or removing the seal to permit juice to flow through the outlet 220. In yet another embodiment, an outlet 220 may include a pressure burstable seal such that the seal automatically opens for applied pressures greater than a preselected threshold pressure. Such a seal may be provided in any appropriate manner including, for example, a membrane designed to burst above the threshold pressure, a weakened seal in a location corresponding to the outlet, a thinned seal in a location corresponding to the outlet, and other appropriate designs. In some embodiments, the seal may alternatively burst in response to deformation of the juicer cartridge instead of in response to pressure.

In one embodiment, an outer shell 210 of a juicer cartridge 200 may include one or more compartments 217, each for holding food matter 205. The one or more compartments 217 may also be in fluid communication with an outlet 220 of the juicer cartridge. As depicted in FIG. 3A, the juicer cartridge 200 may be subdivided into a plurality of compartments 217 for holding the food matter 205. In such an embodiment, the compartments 217 may be separated by a one or more filters 219 to maintain separation of the food matter 205 located within the adjacent compartments until processing by a juicer 100. The one or more filters 219, may also permit fluid communication between the separate compartments 217 during juice extraction from the food matter 205 located therein.

In some embodiments, unprocessed food matter may be cleaned and the resulting food matter 205 may be pre-loaded into the compartments 217 and/organized by type. By way of example, watermelon may be housed in one compartment, while mint is housed in a second compartment, and carrot housed in a third compartment. Depending on the type of juice being made, different types of food matter 205 may be commingled within each compartment. For example, watermelon and blueberry might be housed in one compartment, while ground ginger and cayenne pepper might be housed in a second compartment. In addition to the above, following loading of food matter 205, a juicer cartridge 200 may be vacuum packed prior to sealing or closing by removing air using an appropriate vacuum system. Additionally, a juicer cartridge 200 may injected with an appropriate inert gas following loading and/or vacuum packing. Suitable inert gasses include nitrogen, carbon dioxide, or argon, or any other gas that reduces oxidation, moisture loss, nutrient loss, or product degradation as compared to normal air.

Compartments 217 may be sized according to the food matter placed therein. Therefore, it should be understood that the compartments may have any appropriate size. However, in one embodiment related to consumer appliances, the compartments 217 may range from about 0.25 inches to 2 inches (6 mm to 50 mm) in height depending on the contents of each compartment. However embodiments related to appliances sized for office, corporate, restaurant, and/or food-service applications may have compartments with larger dimensions including, for example, compartments with heights between 2 inches and 5 inches (50 mm to 127 mm), though lesser or greater heights may also be used. Additionally, a compartment may either correspond to an entire juicer cartridge or any appropriate fraction thereof. While a sequential arrangement of the compartments 217 has been depicted in the figures, it should be understood that the compartments 217 and the filters 219 may be arranged in any appropriate manner.

Appropriate filters for use with a juicer cartridge include, but are not limited to, a filtration membrane, a nonwoven filtration material, woven mesh, fabric filters, plates with appropriately sized holes or openings, combinations of the above, and other appropriate types of filters. Additionally, these filters may be made from any appropriate material including, for example, metals such as aluminum, polylactic acid, polypropylene fibers, and blended polyester-polyethylene. In one exemplary embodiment, a filter 219 may be a food-grade porous membrane comprising a plurality of pores of a desired size. Other possible embodiments for the one or more filters include aluminum or plastic meshes, cheesecloth, and paper filters. In view of the above, it should be understood that the one or more filters may correspond to any porous material including pores of a suitable size capable of filtering the juice extracted from a juicer cartridge.

The one or more filters may have an appropriate filtration size selected according to the food matter held in one or more compartments such that liquid can pass through the filters 219 while trapping pulp, seeds, pith, peel, and any other undesirable matter. By way of example, ginger may typically generate large, fibrous pulp matter that can be trapped by larger pores while still permitting the juice extracted from the ginger to pass through the membrane. In contrast, strawberries may process to a pulp matter having small fibers and seeds, which requires a mesh filter with smaller pores to trap the seeds. While in some embodiments, a filtration size may be selected to remove substantially all of the solid material such as pulp from a juice, in some embodiments, a filtration size of a filter might be selected to permit a certain portion of the solid materials to pass through. In instances where a juicer cartridge includes multiple types of food matter in separate compartments requiring different levels of filtration, a juicer cartridge 200 may include one or more filters 219a and 219b with different filtration sizes as depicted in FIGS. 3A-3C.

In some embodiments, it may be desirable to process food matter contained within a juicer cartridge in a manner to help provide uniform juice extraction from all the food matter contained therein. This may help to avoid either over or under extraction of some portions of food matter contained within the juicer cartridge. Therefore, in some embodiments, the individual pieces of food matter 205 may be presized corresponding to hardness, moisture content, and ability to exude juice during extraction. By way of example, in exemplary embodiments, watermelon, a relatively soft fruit high in water content might be divided into relatively larger pieces than pear which is a comparably harder fruit with a lower moisture content. Without wishing to be bound by theory, controlling the size of various types of food matter based on the above noted physical properties may help to ensure full juice extraction from the food matter 205 while substantially avoiding over extraction, under extraction, and excess energy utilization by a juicer.

In some instances, it may be desirable to provide information related to a juicer cartridge to a corresponding juicer. Therefore, in some embodiments, a juicer cartridge 200 can be marked with an indicator 240 that contains data related to the contents of the juicer cartridge and/or conditions that the juicer cartridge has been exposed to, see FIG. 3A. Possible type of information that might be encoded in, or indicated by, the indicator include expiration dates, allergen information, ingredients, nutrition, calorie contents, authorization information, counterfeiting information, and security information. and other appropriate information.

In one embodiment, an indicator 240 may be a machine-readable indicator such as a bar code or QR code imprinted on an exterior of a juicer cartridge 200. Alternatively, other appropriate indicators 240 such as a radio frequency identification ("RFID") tag, magnetic tags, serial numbers or any other type of data carrier that can convey information about the contents of a cartridge 200 to a juicer 100 might be used. In another embodiment, indicator 240 may include an identifier, such as an IP address, URL, or serial number that may be used by a juicer 100 to remotely obtain additional information about the contents of the cartridge. For example, a juicer might communicate with a remote server or database to either obtain, or report, information related to the juicer. In such an embodiment, a juicer 100 can be provided with "smart" functionality that can enable it to send and receive data over the network to enhance the quality of the juicer product and the operator's experience. For example, in exemplary embodiments, indicator 240 can be encoded with an expiration date. The controller of a juicer may read the expiration date indicator 240 and determine whether or not it is safe to process the ingredients of cartridge 200. Alternatively, indicator 240 may be encoded with allergen information. A controller of a corresponding juicer may then read the allergen information and compare it with pre-set information concerning the allergic reactions of the current operator, and determine whether or not it is safe to process the ingredients of the juicer cartridge 200.

Figure 4A:
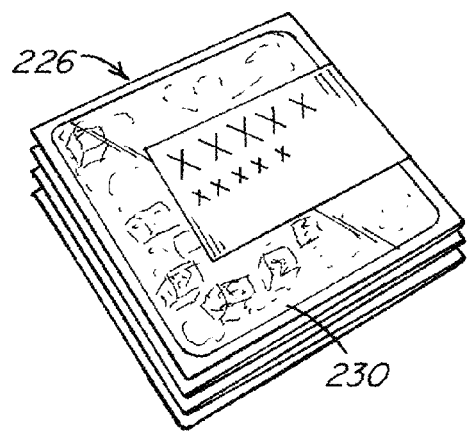
FIG. 4A is a schematic representation of one embodiment of a juicer pouch system.
Figure 4B:
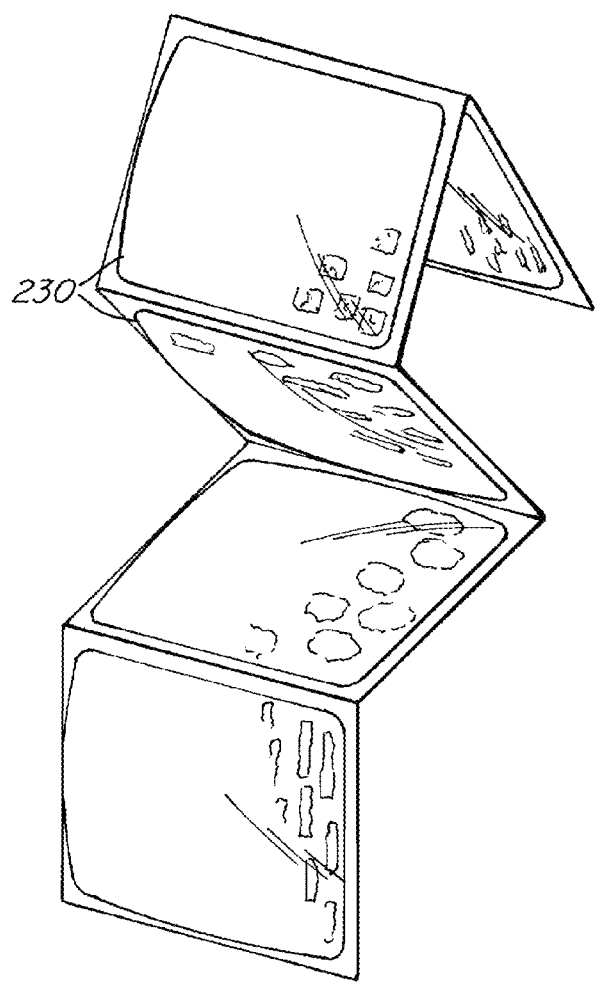
FIG. 4B is a schematic representation of the juicer pouch system of FIG. 4A in an open position.

In another exemplary embodiment, an indicator 240 may be an indicator used to provide information directly to a user. For example, a juicer cartridge may include a tamper indicator that activates when the interior of a juicer cartridge 200 has been breached. For example, a sticker or seal on a juicer cartridge 200 may change color or show visible signs of opening. Additionally, in another instance, a juicer cartridge 200 may include an indicator 240 such as a thermal indicator to indicate whether the contents of the juicer cartridge 200 have gone above or below a predetermined temperature threshold. By way of example, if the controller of the juicer cartridge 200 determines that the contents will suffer nutrient loss if they exceed 50 degrees Fahrenheit, a thermal indicator may activate once that threshold has been exceeded. Conversely, if the contents should be maintained above freezing, or any other appropriate temperature, a thermal indicator may activate upon the contents reaching 32 degrees Fahrenheit. Appropriate thermal indicators include but are not limited to, irreversible temperature-indicating labels and inks or any other appropriate temperature indicating mechanisms Referring to FIGS. 4A and 4B, one possible embodiment of individual compartments including a filter are described in more detail. As depicted in the figure, the compartment and filter may take the form of a package 225 including one or more individual pouches 230. The pouches 230 may be sealed along their edges and placed inside a separate outer shell to form a juicer cartridge as described in more detail below. Depending on the particular embodiment, either the entire pouch surface may be liquid permeable, or only a portion of the pouch surface may be liquid permeable. Additionally, in some embodiments, one or more pouches 230 may be connected along their edges to form a plurality of connected pouches. The pouches may then be used in this connected form, or cut apart and used as individual components. Providing connected pouches may improve manufacturing and convenience for a customer. However, individual pouches may also be used to enable an operator to select any desired combination of individual pouches to place in a corresponding juicer cartridge to produce a desired juice. Thus, in some embodiments, these types of pouches may be used with a corresponding disposable, or reusable, juicer cartridge.

Figure 5:
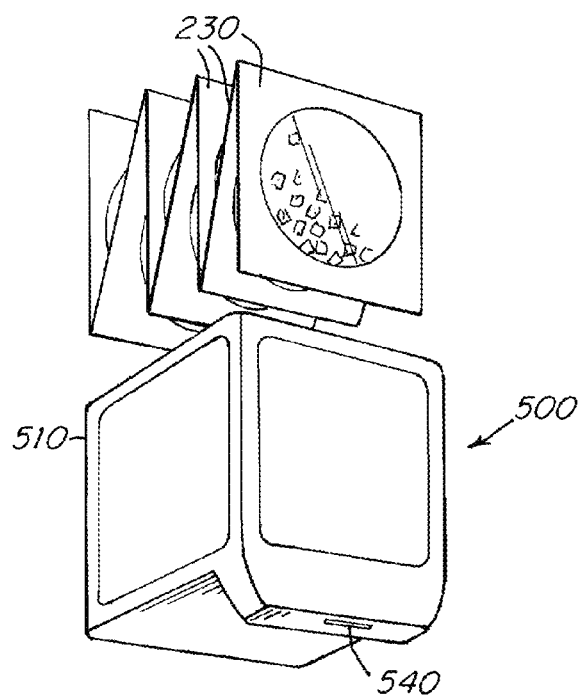
FIG. 5 is a schematic representation of one embodiment of a reusable juicer cartridge.

FIG. 5 depicts one possible embodiment of a reusable juicer cartridge 500. As depicted in the figure, outer shell 510 may be a reusable container including a substantially rigid housing formed of a firm plastic such as polyvinyl chloride. The reusable juicer cartridge 500 may also include an outlet in fluid communication with an interior of the juicer cartridge which may correspond to a slot 540 as depicted in the figure. In some embodiments, the outlet may also include a filter. Alternatively, the outlet 540 may correspond to a structure, such as an arrangement of multiple through holes, to act as both a filter and outlet. Food matter may either be added directly to the reusable juicer cartridge 500, or one or more pouches 230 containing preprocessed food matter may be placed in an opening in a side of the juicer cartridge 500. The juicer cartridge 500 may be sized and shaped to fit within a corresponding region of a juicer. After loading food matter into the juicer cartridge and placing it into a corresponding pressing region of a juicer, a platen, or other device, may be driven downward into the juicer cartridge to compress the food matter contained therein and expel juice through outlet 540. After juice extraction, the reusable juicer cartridge may then be opened and the food matter contained therein can be removed in preparation for preparing more juice. In instances where the reusable juicer cartridge has an opening that remains unsealed during use, the platen, or other device applying pressure to the food matter, may optionally form a seal against an interior surface of the juicer cartridge as it is depressed. Additionally, while a particular juicer cartridge has been depicted, juicer cartridges capable of being compressed in other directions are also possible.

Figure 6A:
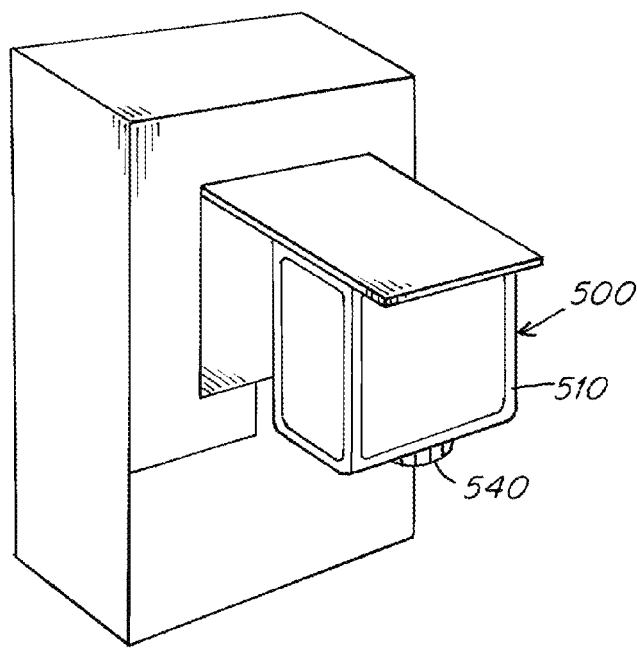
FIG. 6A is a schematic representation of one embodiment of a juicer and a reusable juicer cartridge.
Figure 6B:
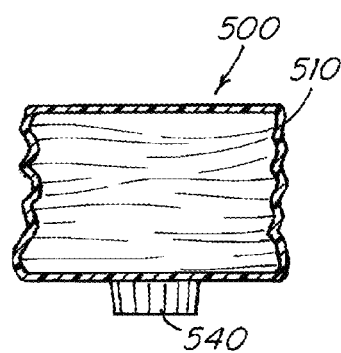
FIG. 6B is a schematic representation of the juicer and reusable juicer cartridge of FIG. 6A after being compressed.

In another embodiment, a reusable juicer cartridge may be compressible instead of rigid, see FIGS. 6A-6B. In such an embodiment, an outer shell 510 of a juicer cartridge 500 may be constructed and arranged such that it is flexible and can be compressed inside of a corresponding juicer. Similar to the above, the juicer cartridge 500 may include an outlet 540 in fluid communication with an interior of the juicer cartridge. The outlet 540 may also either be associated with a filter, or it may be constructed to act as a filter. The juicer cartridge 500 may be configured to receive one or more pouches containing preprocessed food matter or food matter may simply be added to the juicer cartridge by a user. When the compressible juicer cartridge is positioned into a corresponding juicer 100, the outer shell 510 may be compressed in order to apply pressure to the food matter therein and extract the juice, see FIGS. 6A-6B. The reusable juicer cartridge 500 may then be opened and the food matter contained therein removed in preparation for preparing more juice. Alternatively, the juicer cartridge may be disposable as the current disclosure is not so limited.

In the above embodiments describing a reusable juicer cartridge, the outer shell 510 and/or pod 500 may be dishwasher safe to help facilitate easy cleaning. Additionally, the materials used to form the reasonable juicer cartridge may be BPA-free.

Figure 7A:
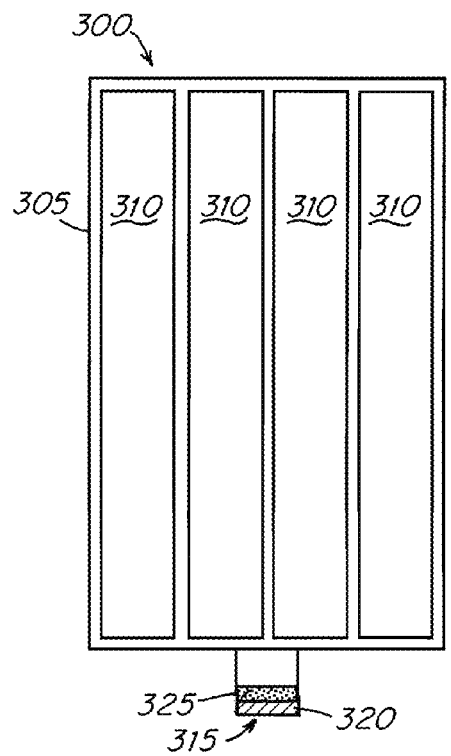
FIG. 7A is a schematic representation of a juicer cartridge including separate compartments located within an exterior pouch.
Figure 7B:
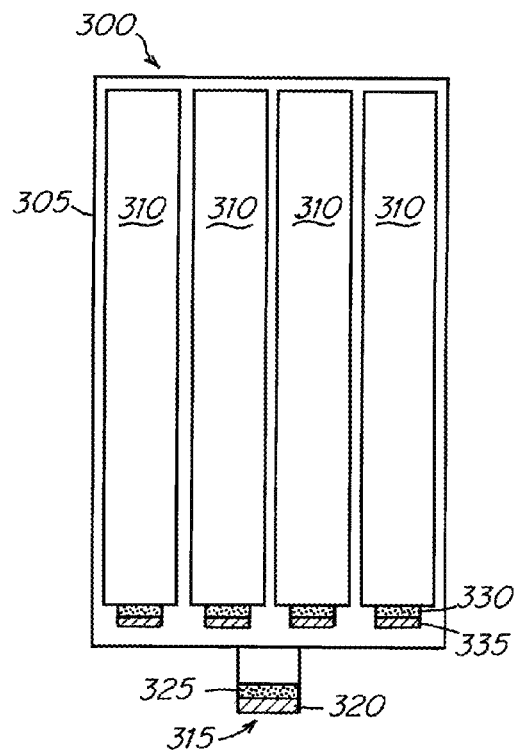
FIG. 7B is a schematic representation of a juicer cartridge including separate compartments with separate seals and filters located within an exterior pouch.
Figure 7C:
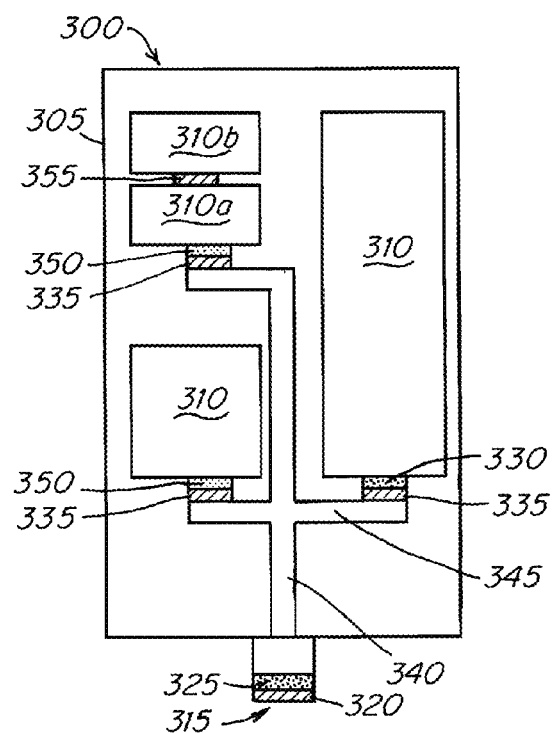
FIG. 7C is a schematic representation of one embodiment of a juicer cartridge including separate compartments and a combining chamber connected to an outlet.

FIGS. 7A-7C depict various embodiments of juicer cartridges including one or more compartments containing food matter.

FIGS. 7A and 7B are directed to an embodiment of a juicer cartridge 300 including one or more liquid permeable compartments 310 that are adapted and arranged to at least partially surround food matter contained therein. The liquid permeable compartments 310 may be positioned within a liquid impermeable compartment 305 such that the liquid impermeable compartment at least partially surrounds the one or more liquid permeable compartments. For example, one or more pouches containing food matter similar to those described above might be contained within an exterior pouch. In addition, the juicer cartridge may include an outlet 315 in fluid communication with an interior of the liquid impermeable compartment 305. As noted above, the juicer cartridge 300 may be shaped and sized to fit within a corresponding region of a juicer. When compressed within a juicer, the juicer cartridge may compress the food contained therein to extract juice from the food matter. The extracted juice may then flow from within the one or more liquid permeable compartments to the liquid impermeable compartment. Subsequently, the juice may flow from within the liquid impermeable compartment to outside of the juicer cartridge through the outlet 315. Depending on the particular embodiment, the outlet may include a seal 320 and/or filter 325 as described above.

Depending on the embodiment, the liquid permeable compartments may either be constructed from a material that is liquid permeable or they may include appropriate features through which a liquid may flow. For example, as illustrated in FIG. 7A, the individual liquid permeable compartments 310 may correspond to pouches made from a liquid permeable material. Appropriate liquid permeable materials may include a filtration membrane, a nonwoven filtration material, a woven mesh, a fabric filter, a plastic mesh, cheesecloth, paper filter materials, or any other appropriate permeable material capable of being used in a juicing process. In such an embodiment, the liquid permeable compartments 310 may also function as filters for the food matter contained therein during juice extraction. Alternatively, as depicted in FIG. 7B, each of the liquid permeable compartments may include an outlet corresponding to a filter 330 and/or a seal 335 that may be burst above a preselected pressure threshold during juice extraction. In such an embodiment, the remaining portion of the liquid permeable compartment may be made from a liquid impermeable material. Therefore, during juice extraction, the liquid extracted from the food matter may flow out of the liquid impermeable compartments 310 through the outlet corresponding to filter 330 and seal 335 and into the liquid impermeable compartment 305. The liquid may subsequently flow out through the outlet 315 similar to the above.

FIG. 7C depicts another embodiment of a juicer cartridge 300 including a plurality of compartments 310 adapted to contain food matter. Similar to the above the juicer cartridge may include an outlet 315 that may include a seal 320 and/or a filter 325. In addition, the juicer cartridge may include a combining chamber 340 located between the outlet 315 and the plurality of compartments 310. During juice extraction the combining chamber 340 may be in direct fluid communication with the outlet 315 and the plurality of compartments 310. Alternatively, in some embodiments, during juice extraction, the plurality of compartments 310 may be in fluid communication with the outlet 315 through the combining chamber 340 and one or more secondary channels 345 located between the compartments and the combining chamber. During juice extraction, liquid may flow from the individual compartments 310, through the secondary channels 345, and into the combining chamber 340. Thus, the juice extracted from the individual compartments may be combined into a single stream within the combining chamber 340 prior to being output though the outlet 315.

Depending on the embodiment, and as depicted in the figure, each compartment 310 may include a seal 335 and/or a filter such as 330 and 350. While these filters and seals are depicted as being located at an outlet from each compartment, they might be located at any point between the individual compartments 310 and the outlet 315. For example, a filter and/or seal might be located within a secondary channel 345 or the combining chamber 340 as the disclosure is not limited in this fashion. Additionally, as illustrated in the figure by filters 330 and 350, the filters associated with separate compartments 310 may have different filtration sizes to provide appropriate filtration for different types of food matter. These seals may be constructed to burst above a predetermined pressure threshold, rupture due to deformation during juice extraction, or may otherwise be constructed to open during juice extraction. Consequently, the plurality of compartments 310 may not be in fluid communication with the outlet 315 prior to juice extraction, and may be in fluid communication with the outlet 315 once juice extraction has begun. While the outlet and individual compartments have both been depicted as including separate filters and seals, embodiments in which only the individual compartments include seals and filters, only the secondary channels and/or combining chamber include filters and seals, and/or only the outlet includes a filter and seal are also contemplated.

FIG. 7C also depicts an embodiment in which two or more compartments 310a and 310b are associated with each other. As depicted in the figure, a seal 355 may be located between the two compartments. The seal 355 may be designed to burst during juice extraction due to either exceeding a pressure limit or from deformation. Therefore, the compartments 310a and 310b are not in fluid communication with one another prior to juice extraction. During juice extraction, the seal 355 may burst placing the two compartments into fluid communication with one another. This may permit fluid and/or food matter to flow from one compartment to another. For example, a liquid, or liquid containing food matter might be located in compartment 310b and a dry ingredient, or other appropriate type of food matter, might be located in compartment 310a. During juice extraction the seal 355 may be ruptured permitting liquid to flow from compartment 310b into compartment 310a. The liquid and dry ingredient may then mix to either dissolve the dry ingredient or form a suspension. As juice extraction continues, a seal associated with the compartment 310a may also rupture and the mixture may flow through the associated filter, secondary channel, and/or combining chamber to the outlet 315.

In some embodiments, it is desirable for a juicer cartridge to be constructed and arranged such that juice, or other liquid, extracted from the cartridge does not contact the juicer. This may beneficially eliminate the need to clean the juicer after each operation. In such an embodiment, the juicer cartridge includes a compartment including a self-contained volume of liquid. Depending on the embodiment, the volume of liquid may be entrapped within food matter located in the compartment such that the liquid is extracted from the food matter when compressed in a pressing chamber of an associated juicer. The juicer cartridge also includes an outlet in fluid communication with the compartment. The outlet is constructed and arranged such that it extends out from the juicer so that at least a portion of the outlet is not compressed by the juicer during a juice extraction operation. For example, and as described in more detail below, the outlet may be constructed and arranged such that it extends out of a pressing chamber of the associated juicer to direct liquid to a desired container without contacting the juicer.

In some embodiments, it may also be desirable for a juicer cartridge to produce enough juice, or other liquid, for either a shot, full-sized beverage, or multiple full sized beverages. For example, in some embodiments, the volume of juice produced is between about 1 ounce and 20 ounces (0.03 liters and 0.6 liters), 1 ounce and 16 ounces (0.03 liters and 0.5 liters), 6 ounces to 12 ounces (0.2 liters and 0.35 liters), 20 ounces to 80 ounces (0.6 liters and 2.4 liters), 80 ounces to 140 ounces (2.4 liters and 4.0 liters), or any other appropriate volume as the disclosure is not so limited. Depending on the application, a juicer cartridge includes at least a first compartment containing between about 1 ounce and 20 ounces (0.03 kg to 0.6 kg), 20 ounces to 80 ounces (0.6 kg to 2.3 kg), 80 ounces to 160 ounces (2.3 kg to 4.5 kg), or any other appropriate mass of food matter. When the compartment, and food matter contained therein is compressed by an associated juicer, the food matter produces a ratio of juice volume in liters (L) to food matter mass in kilograms (kg) that is between about 0.4 L/kg to 0.85 L/kg, 0.5 L/kg to 0.75 L/kg, or any other appropriate ratio. Similar ratios for fluid ounces of juice produced to mass ounces of food matter are obtained. As described in more detail below, this juice yield may be in response to a final compression force applied to the juicer cartridge and food matter contained therein that is between about 6700 N to 35,600 N (1500 pounds to 8000 pounds) for a consumer appliance, about 7750 N to 44,500 N (1750 pounds to 10,000 pounds) for an office or corporate appliance, and about 8900 N to 53,400 N (2000 pounds to 12,000 pounds) for a restaurant or food service appliance. While a single compartment is described above, it should be understood that similar to the previously described embodiments, the juicer cartridge may also include a second compartment where the first compartment is at least partially disposed within the second apartment. Additionally, in some embodiments, and as described in more detail below, the first and second compartments may be disposed within a third compartment. In such an embodiment, the third compartment is preferably liquid impermeable and at least one of the first compartment and the second compartment is liquid permeable.

One particular embodiment of a juicer cartridge 400 is depicted in FIGS. 8A-8D. In the depicted embodiment, the juicer cartridge includes a shell 402 and a sealing layer 404 attached to the shell. Depending on the embodiment, the sealing layer is a polymer film though in other embodiments it may be a rigid sheet as the disclosure is not so limited. In either case, the shell 402 and the sealing layer 404 are attached along their perimeters to form a sealed compartment as depicted in the figures. A pouch 410, corresponding to one or more compartments containing food matter 412, is disposed within the outer compartment formed by the shell 402 and the sealing layer 404. When the juicer cartridge 400 is positioned within a corresponding pressing chamber of a juicer, the juicer cartridge is compressed from a first height to a smaller second height such that the food matter contained within the patch 410 is compressed to extract juice therefrom. The extracted juice is then dispensed from the outlet 406 as described in more detail below.

In some embodiments, it is desirable to evenly distribute food matter between the pressing elements of an associated juicer when the juicer cartridge 400 is positioned therein. In such an embodiment, the compartment corresponding to the shell 402 and sealing layer 404, or other appropriate construction, has a cross-sectional area that is substantially equal to an area of a pressing surface of the pressing elements when it is positioned within the pressing chamber of a juicer. Correspondingly, the pouch 410 corresponding to one or more compartments containing the food matter 412 initially has a cross-sectional area that is substantially less than an area of the corresponding pressing surfaces of the pressing elements. For example, the cross-sectional area of the pouch 410 may be less than about 90%, 80%, 75%, or any other appropriate percentage of the pressing area of the corresponding pressing elements. During compression of the juicer cartridge 400 within a pressing chamber of the juicer, the one or more compartments corresponding to the pouch 410 are deformed such that a cross-sectional area of the pouch is substantially equal to the area of the corresponding pressing surfaces. Depending on the particular embodiment, an initial first height of the juicer cartridge within the juicer pressing chamber is less than or equal to about 38 mm (1.5 inches), 95 mm (3.75 inches), 127 mm (5 inches), or any other appropriate height and the juicer cartridge is constructed and arranged to be compressed from that initial first height to a second height that is less than the first between about 4 mm and 9 mm (0.15 inches and 0.35 inches), 6 mm and 15 mm (0.25 inches and 0.6 inches), 8 mm and 25 mm (0.3 inches to 1 inch), or any other appropriate height.

In some instances, it is desirable to protect the food matter contained within a juicer cartridge from forces being applied to it prior to juice extraction. This includes forces that might be present due to either storage or shipping of the juicer cartridges where they might be subjected to shocks and/or loading from being stacked on top of each other, handled, and/or possibly dropped. While rigid shells, such as the shell 402, might be constructed and arranged to provide sufficient structural rigidity to protect the food matter, in some embodiments, the juicer cartridge 400 also includes an open space 414 corresponding to a gas volume located within a sealed compartment such as that provided by the shell 402 and sealing layer 404. As depicted in FIG. 8C, the open space 414 corresponds to the space located between a compartment containing food matter 412, such as the pouch 410, and the larger sealed compartment corresponding to the shell 402 and sealing layer 404. The open space 414 is sized such that it contains a sufficient volume of gas to space at least a portion of the second compartment from the first compartment. The depicted gas volume sealed within the compartment formed by shell 402 and sealing layer 404 functions as an air cushion similar to air cushions used for shipping materials. However, in the depicted embodiment, the material, e.g. the food matter, being protected is disposed inside of the air cushion. Consequently, when a force is applied to the shell 402 and/or sealing layer 404, the gas volume located therein will become pressurized to resist further compression of the juicer cartridge 400, thus, protecting the food matter 412 contained therein. It should be understood that the pouch 410 and food matter 412 may correspond to any appropriate volume percentage of the surrounding compartment formed by the shell 402 and the sealing layer 404, or other appropriate construction. For example, the pouch and food matter may have a volume that is less than about 75%, 50%, or any other appropriate percentage of the surrounding compartment volume. Additionally, the pouch and food matter may have a volume that is greater than about 25%, 50%, or any other appropriate percentage of the surrounding compartment volume. While any appropriate gas might be used to fill the depicted open-space 414, the gas volume may comprise at least one of nitrogen, carbon dioxide, and/or argon.

As noted above, the juicer cartridge 400 also includes an outlet 406. Referring to FIG. 8D, in this embodiment, the outlet is formed by an upper layer 406a and an adjacent lower layer 406b corresponding to the shell 402 and sealing layer 404 respectively. In order to form a sealed compartment, portions of the upper and lower layers 406a and 406b are sealed to one another along their perimeters using any appropriate sealing technique including, but not limited to, lamination techniques, adhesives, and ultrasonic welds. In an alternative embodiment, a separate material is applied along the perimeters of the upper and lower layers 406a and 406b to seal the compartment. The outlet also includes a detachment line 408 located within the region of the outlet 406 where the upper and lower layers are not sealed to one another. The detachment line may correspond to a scored, perforated, or any other appropriately weakened section of the outlet such that a detachable portion 406c is formed at a distal portion of the outlet. Consequently, when it is desired to use the juicer cartridge 400, the detachable portion 406c is either automatically or manually removed from the juicer cartridge and the upper and lower layers form an open end 408a of the outlet extending out from the juicer cartridge 400. Once the detachable portion is removed, the juicer cartridge 400 may be compressed by an associated juicer to extract juice from the food matter contained therein. The extracted juice then flows out through the now opened outlet 406. While an outlet 406 has been depicted as including a detachable portion 406c, in some embodiments, the outlet does not include a detachable portion and instead is constructed and arranged to be pierced along a portion of the outlet where the upper layer and lower layer are not sealed to one another. In such an embodiment, juice extracted from the juicer cartridge 400 flows through the outlet 406 and out of the pierced portion of the outlet.

In some embodiments, and as noted previously, it is desirable for the outlet 406 to provide a no drip functionality. For example, in the embodiment depicted in FIGS. 8A-8D, the outlet 406 formed by the adjacent upper and lower layers 406a and 406b function as a valve in a manner that is similar to a duckbill valve. Namely, the valve formed by the outlet opens, and thus permits the flow of a fluid there through, during active compression by an associated juicer during juice extraction. Correspondingly, the valve formed by the outlet closes to prevent the flow of fluid once the compressive force of the juicer has been removed. This opening and closing of the valve formed by the outlet may be further facilitated by the associated juicer retracting the pressing element applying the compressive force to the juicer cartridge after juice extraction has been completed. Without wishing to be bound by theory, the juicer cartridge 400 as well as the food matter 412 contained, will expand slightly which will create some amount of suction. This function combined with the valve formed by the outlet 406 function together to substantially prevent dripping from the outlet after juice extraction. It should be understood that the functionality of the valve formed by the outlet may be tailored using such parameters as the rigidity of the various layers, the spacing of the layers relative to one another, the sizing of the channel between the layers, and other appropriate design parameters. While a particular construction of the outlet is described above, it should be understood that an outlet capable of functioning as a valve may be formed in any number of ways and that the current disclosure should not be limited to only the specific construction depicted in the figures.

Figure 8A:
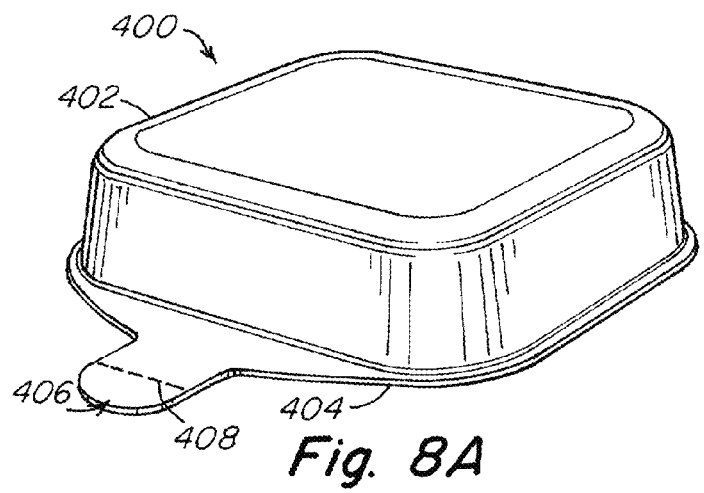
FIG. 8A is a schematic perspective view of a juicer cartridge.
Figure 8B:
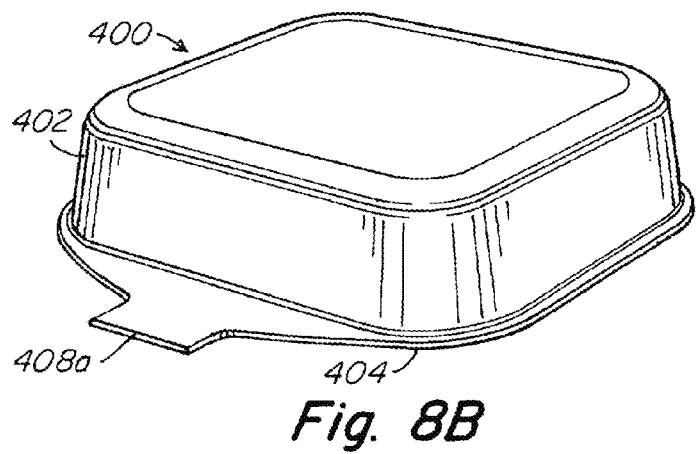
FIG. 8B is a schematic perspective view of the juicer cartridge of FIG. 8A with the detachable portion of the outlet removed.
Figure 8C:
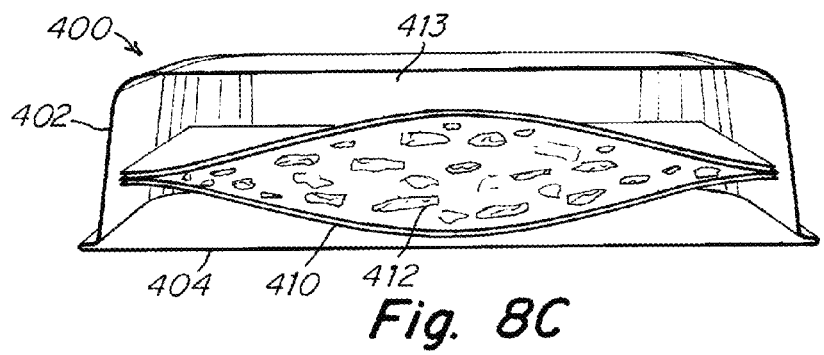
FIG. 8C is a schematic cross-sectional view of a juicer cartridge.
Figure 8D:
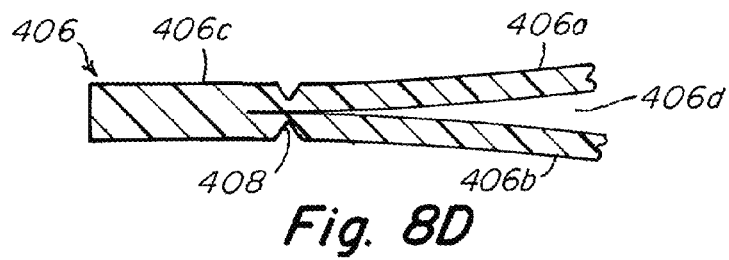
FIG. 8D is a schematic cross-sectional view of an outlet including a detachable portion.
Figure 9A:
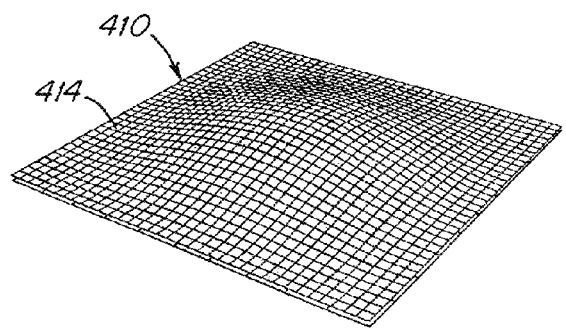
FIG. 9A is a schematic exploded perspective view of a pouch configured and arranged to contain food matter.
Figure 9B:
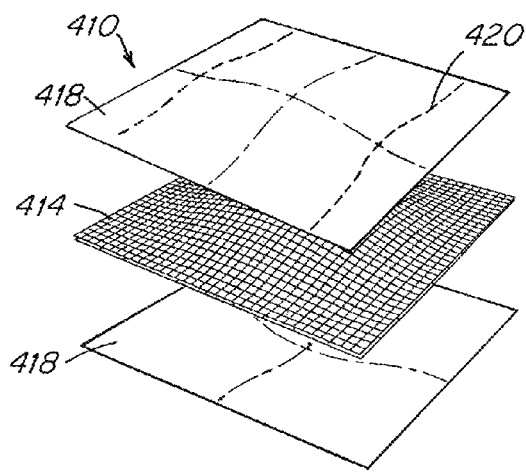
FIG. 9B is a schematic exploded perspective view of a pouch configured and arranged to contain food matter.
Figure 9C:
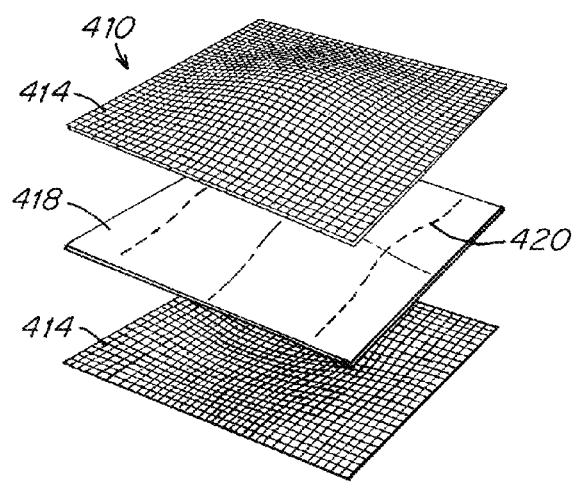
FIG. 9C is a schematic exploded perspective view of a pouch configured and arranged to contain food matter.

FIG. 9A-9C depict various embodiments of a pouch 410 that may either be used individually, or in combination with an outer compartment such as that formed by the shell 402 and sealing layer 404 depicted in FIGS. 8A-8C. In FIG. 9A, the pouch 410 corresponds to a single compartment formed by a liquid permeable layer 414 such as a filter or mesh. In contrast, the embodiments depicted in FIGS. 9B and 9C correspond to pouches 410 that include a first compartment at least partially disposed within a second compartment. In FIG. 9B, a first compartment formed from a liquid permeable layer 414, such as a filter or mesh, is disposed within a second compartment formed from one or more liquid impermeable layers 418. Liquid containing food matter is contained within the first compartment formed from the liquid permeable layer 414. Depending on the particular embodiment, one or more of the liquid impermeable layers include one or more weakened areas 420 corresponding to scorings, perforations, thinned edges, or any other appropriate construction. When compressed by an associated user, the weakened areas 420 rupture or burst to permit juice extracted from the food matter contained within the pouch 410 to flow through the liquid permeable layer 414 and through the now ruptured weakened areas 420 of the liquid impermeable layers 418. FIG. 9C depicts a related embodiment of a pouch 410 where a first compartment corresponding to one or more liquid impermeable layers 418 including one or more weakened areas 420 is disposed within a second compartment corresponding to one or more liquid impermeable layers 414.

Figure 10A:
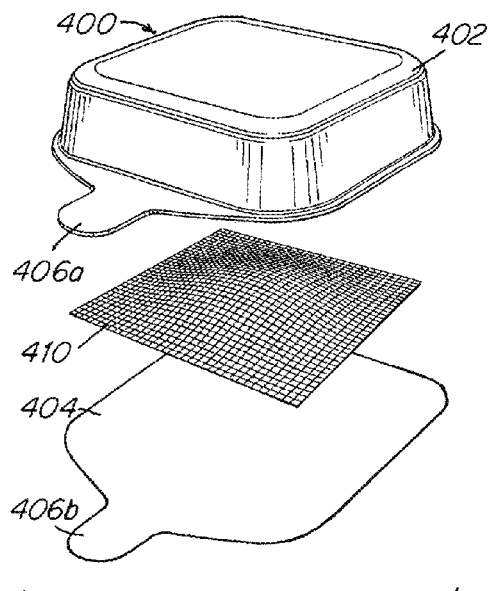
FIG. 10A is a schematic exploded perspective view of a single liquid permeable pouch contained within an outer shell and sealing layer.
Figure 10B:
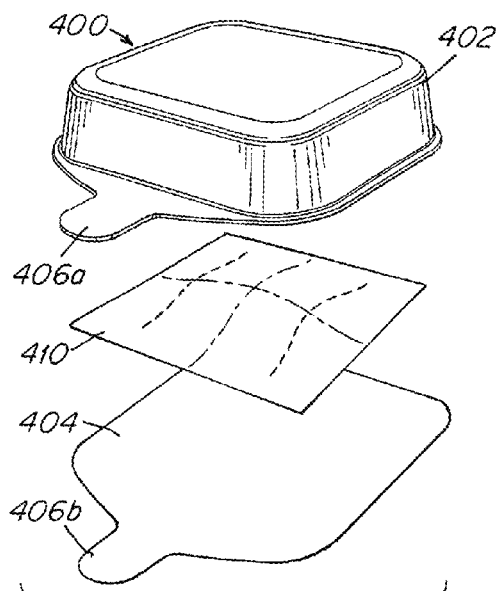
FIG. 10B is a schematic exploded perspective view of a burstable pouch contained within an outer shell and sealing layer.
Figure 10C:
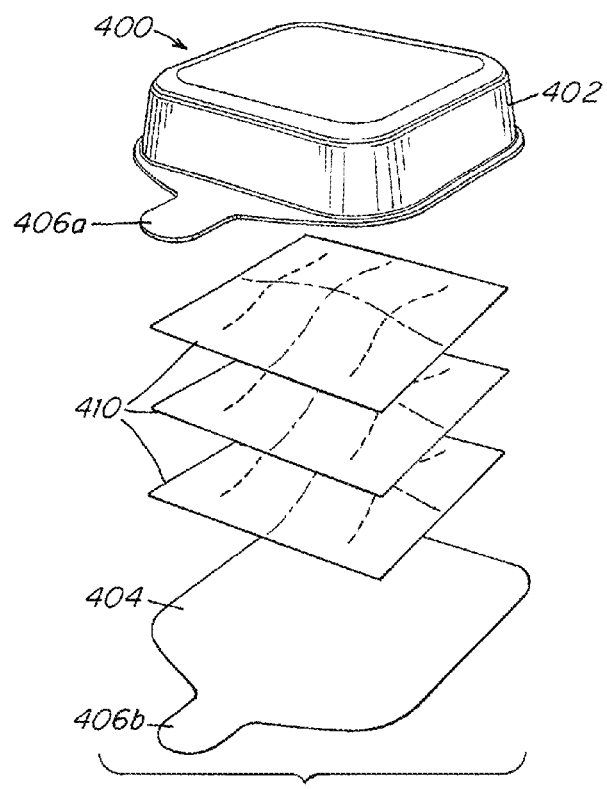
FIG. 10C is a schematic exploded perspective view of a plurality of burstable pouches contained within an outer shell and sealing layer.

It should be understood that the embodiments of the pouch 410 may be combined with a third compartment that is either liquid permeable or liquid impermeable, where the pouch 410 is at least partially disposed within the compartment, see FIGS. 10A and 10B. in the depicted embodiments, a pouch 410 is disposed within a sealed compartment formed by the corresponding shell 402 and sealing layer 404. In some embodiments, a single pouch 410 is disposed within this third compartment. However, embodiments in which multiple pouches 410 are disposed within a single exterior compartment are also contemplated. For example, as depicted in FIG. 10C, a plurality of pouches 410 containing food matter are disposed within an exterior compartment formed by the shell 402 and sealing layer 404. In view of the above, it should be understood that the pouches 410 may either correspond to pouches formed by single compartments or a plurality of compartments with any appropriate arrangement of liquid permeable and/or liquid impermeable layers as the disclosure is not so limited.

While the individual pouches 410 depicted in FIG. 10C may be arranged in any appropriate fashion, including both horizontal and vertical stacking, arranging the pouches 410 in a vertical arrangement as depicted in the figure offers several benefits. For example, when multiple pouches are sequentially arranged between the pressing elements of an associated juicer, the force applied by the pressing elements to the juicer cartridges is evenly applied to all of the food matter contained within the separate pouches 410. Without wishing to be bound by theory, this may facilitate more even and complete juice extraction from the food matter contained within the juicer cartridge 400. This is in contrast to arrangements where the separate pouches are horizontally arranged relative to the pressing elements of an associated juicer when the juicer cartridge is positioned therein. In such an arrangement, the pressing elements of the associated juicer will apply a larger compressive force to the harder food matter contained within the pouches 410 which may result in incomplete juice extraction from the food matter in the other surrounding pouches.

FIGS. 11A-11F present one embodiment of a juicer 450. In the depicted embodiment, the juicer includes a body 452 and a cover 462 that can be rotated about a pivot connection to open the juicer. The juicer also includes a first pressing element 454 which includes a first pressing surface constructed and arranged to contact a juicer cartridge 400. Depending on the embodiment, the first pressing element 454 is stationary. The juicer also includes a second pressing element including at least one sidewall 458 attached to a top wall 456. The top wall functions as a second pressing surface that is constructed and arranged to contact the juicer cartridge 400. Additionally, the first pressing element 454, the at least one sidewall 458 and top wall 456 cooperate to form an open chamber 460. In the depicted embodiment, the at least one sidewall corresponds to a single rounded sidewall 458 that includes an opening to the open chamber 460. Additionally, in some embodiments, the top wall 456 and the at least one sidewall 458 form a cantilever structure, though other arrangements and constructions are also possible. The open chamber 460 is sized and shaped to accept a corresponding juicer cartridge 400 when the cover 462 is opened, see FIG. 11B. Additionally, in some embodiments, the opening in the at least one side wall is sized and shaped such that the juicer cartridge may be inserted through the opening and into the chamber. Similar to the embodiments described above, and outlet 406 of the juicer cartridge 400 extends out from the juicer such that juice extracted from within the juicer cartridge does not contact the various portions of the juicer during operation. The juicer 450 also includes a drive, not depicted, that is constructed and arranged to apply a downward directed force to the at least one sidewall. This downward force displaces the second pressing element and associated second pressing surface, corresponding to the top wall 456, towards the pressing surface of the first pressing element 454, see FIG. 11F. as depicted in the figure, the chamber 460 remains open during juice extraction.

In addition to the various components described above, the juicer 450 depicted in FIGS. 11A-11F, is also angled relative to a surface it is positioned on. Correspondingly, the various pressing elements and pressing surfaces are also angled relative to the surface the juicer 450 is positioned on. Without wishing to be bound by theory, such an arrangement utilizes gravity to further facilitate the flow of juice from within a compressed juicer cartridge through the outlet 406 and out of the associated juicer 450. Appropriate angles of the pressing elements, pressing surfaces, and other appropriate components of the juicer relative to the surface on which the juicer is disposed are greater than about 10°, 20°, 30°, or any other appropriate angle. Additionally the angle may be less than about 45°, 40°, 30°, or any other appropriate angle. For example, the angle may be between about 20° and 45°.

Figure 12:
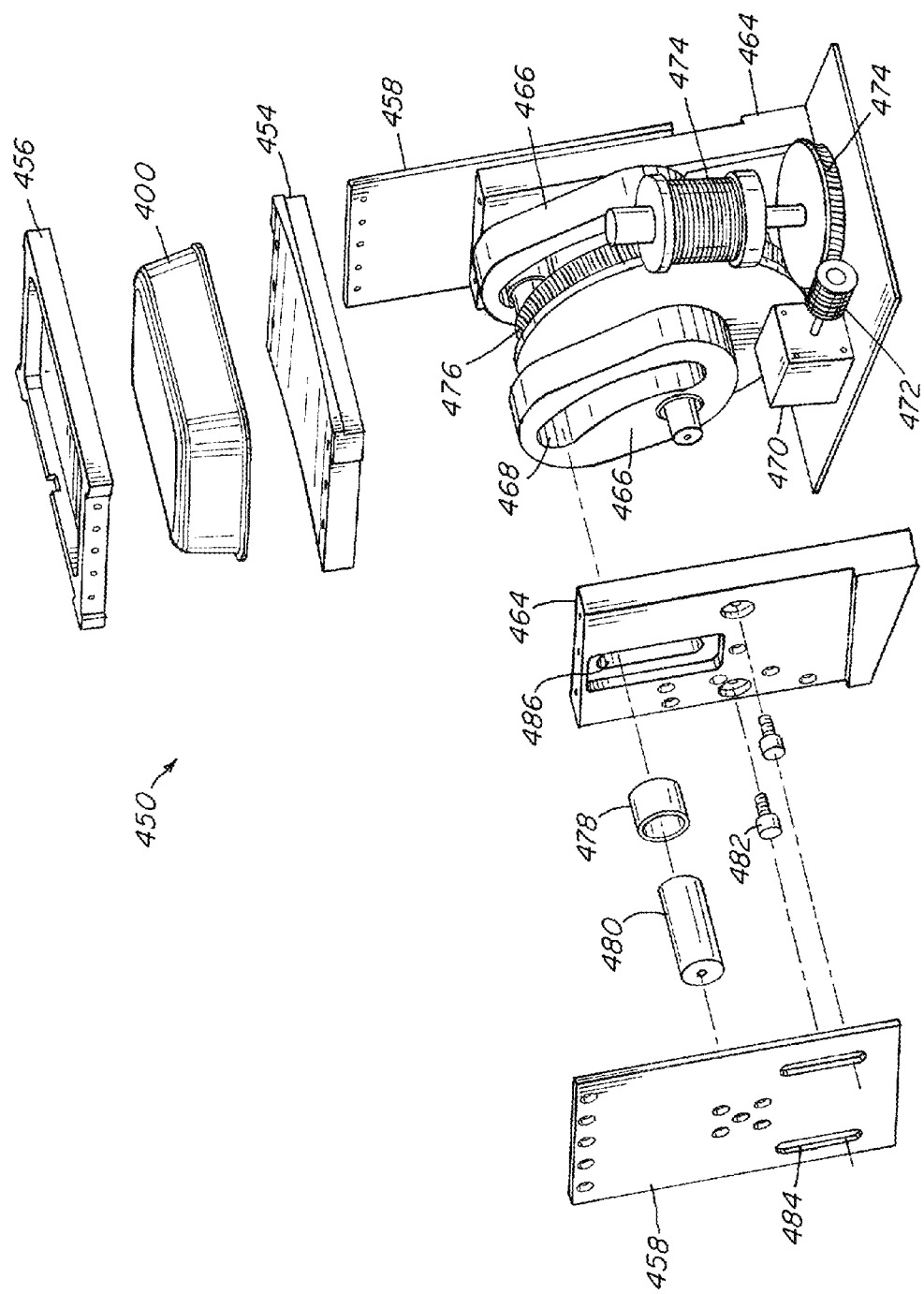
FIG. 12 is a schematic perspective exploded view of a juicer and an associated juicer cartridge.

In some embodiments, it is desirable to control both the magnitude and timing of force application during a juice extraction process. One specific embodiment of a juicer 450 that is constructed to apply a desired force profile is depicted in FIGS. 12-13C. In the depicted embodiment, the juicer includes a first pressing element 454 and a second pressing element 456 disposed above the first pressing element. The first and second pressing elements define a pressing chamber located between them that is constructed and arranged to contain an associated juicer cartridge 400. Similar to the above embodiments, the second pressing element 456 is connected to two sidewalls 458 arranged on opposing sides of the second pressing element. As illustrated in FIG. 13A, a downward directed force is applied to the second pressing element by an associated drive to displace it towards the first element and compress the juicer cartridge 400 there between. The sidewalls 458 and connected second pressing element 456 are guided downwards along a desired path through the use of associated guide pins 482 which are attached to the corresponding support walls 464 and positioned within the guide slots 484 formed in the sidewalls 458.

While any appropriate drive such as a hydraulic or pneumatic system might be used to power the juicer 450, in this embodiment, an electromechanical drive is used. The electromechanical drive is constructed and arranged such that it fits within a footprint of the juicer that is substantially equal to an area of the first and second pressing elements. However, embodiments in which the drive is either smaller, or larger, then an area of the first and second pressing elements are also contemplated. The electromechanical drive includes one or more cams 466 including a slot forming a camming surface 468 with a desired camming profile. The camming profile is shaped to provide a desired force profile versus pressing element displacement. The one or more cams 466 are driven by a motor 470 connected to the cam 466 by an associated transmission which may include various components such as a worm gear 472, one or more intermediate reducing gears 474, and a final spur gear 476 attached to the one or more cams 466. While a particular transmission is depicted in the figures, any appropriate transmission including various combinations of cams, wedges, linkages, gear trains, hydraulic components, pneumatic components, or any other appropriate form of transmission might be used. In the depicted embodiment, two cams are attached to the spur gear 476 and separately attached to the two sidewalls 458. When the spur gear 476 is rotated by the associated motor 470 and transmission, the camming surfaces 468 of the cams 466 rotate to displace associated cam pins 480 which are located within the slots forming the camming surfaces 468. The cam pins are also attached to the sidewalls 458, and pass through a bushing 478 and vertically oriented elongated slots 486 located in the support walls 464. Thus, as the spur gear 476 and associated cams 466 are rotated, the cam pins 480 are displaced either up or down depending on the direction of rotation of the motor. Correspondingly, the associated second pressing element 456 is either displaced towards or away from the first pressing element 454, see FIGS. 13A-13C. This relative displacement of the pressing elements compresses a juicer cartridge 400 located between the two pressing elements to dispense juice from an outlet 406 extending out from the juicer and into a corresponding glass 486, or other appropriate container. One advantage of keeping the lower first pressing element 454 stationery is illustrated by FIG. 13C. Specifically, in such an embodiment, the outlet 406, or other dispensing point of juice from the juicer, is held stationary relative to the glass 486. In other words, the outlet 406 is maintained at a constant height relative to a surface on which the juicer is disposed to facilitate dispensing of the juice into the glass 486.

Regardless of the specific type of drive used, a juicer drive system may be constructed and arranged to provide a desired force profile during juice extraction. For example, in one embodiment, a drive is constructed and arranged to displace a second pressing element towards a first pressing element similar to the embodiment noted above. Additionally, the drive is constructed and arranged to apply between about: 6700 N to 35,600 N (1500 pounds to 8000 pounds) or 17,800 N to 26,700 N (4000 pounds to 6000 pounds) for a consumer appliance; 7750 N to about 44,500 N (1750 pounds to 10,000 pounds) for an office or corporate appliance; and 8900 N to about 53,400 N (2000 pounds to 12,000 pounds) for a restaurant or food service appliance to an associated juicer cartridge during a final portion of the second pressing element displacement. The final portion over which the above noted forces are applied is between about the final: 3 mm and 13 mm (0.1 inches to 0.5 inches) for a consumer appliance; 5 mm and 20 mm (0.2 inches and 0.8 inches) for an office or corporate appliance; 9 mm and 30 mm (0.35 inches to 1.2 inches) for a restaurant or food service appliance, or any other appropriate final amount of travel of the second pressing element. Without wishing to be bound by theory, applying the larger forces during the final portions of operation may help to limit the duration over which stresses are applied to the juicer. Additionally, this force profile may enhance juice extraction by applying the larger forces after the food matter has been fully distributed within a pressing chamber of the juicer and after the food matter is more fully confined within that space. In addition to controlling the force profile, the second pressing element may have a total displacement that is less than or equal to about: 38 mm (1.5 inches) for a consumer appliance; 95 mm (3.75 inches) for an office or corporate appliance; 127 mm (5 inches) for a restaurant or food service appliance, or any other appropriate distance as the disclosure is not so limited. Additionally, a gap between about: 4 mm and 9 mm (0.15 inches to 0.35 inches) for a consumer appliance; 6 mm and 15 mm (0.25 inches and 0.6 inches) for an office or corporate appliance; 8 mm and 25 mm (0.3 inches to 1 inch) for a restaurant or food service appliance, or any other appropriate range of distances may be left between the first and second pressing elements after the second pressing element has been fully displaced during juice extraction. While an embodiment in which one of the pressing elements is held stationary is described above, embodiments in which both pressing elements of the juicer are displaced are also contemplated. In such an embodiment, the distances noted above may apply to the combined travel of the pressing elements. Additionally, while particular forces and distances are noted above with regards to particular applications, it should be understood that any appropriate combination of forces and distances, including forces and distances that are both greater and less than those noted above, might be used as the disclosure is not so limited.

In addition to the above, FIG. 12 depicts an embodiment in which, at least a portion of one or more of the pressing elements 454 and 456 includes a concave pressing surface in addition to forming a pressing chamber in which the associated juicer cartridge 400 is positioned. Specifically, the upper surface of the first pressing element oriented towards the juicer cartridge 400 has a concave shape across its entire surface and the corresponding second pressing element 456 has a pressing surface oriented towards the juicer cartridge 400 that is substantially flat. However, as previously noted, the second pressing element might also have a concave surface, a convex surface, and/or a surface that complements a shape of the corresponding first pressing element.

Figure 14:
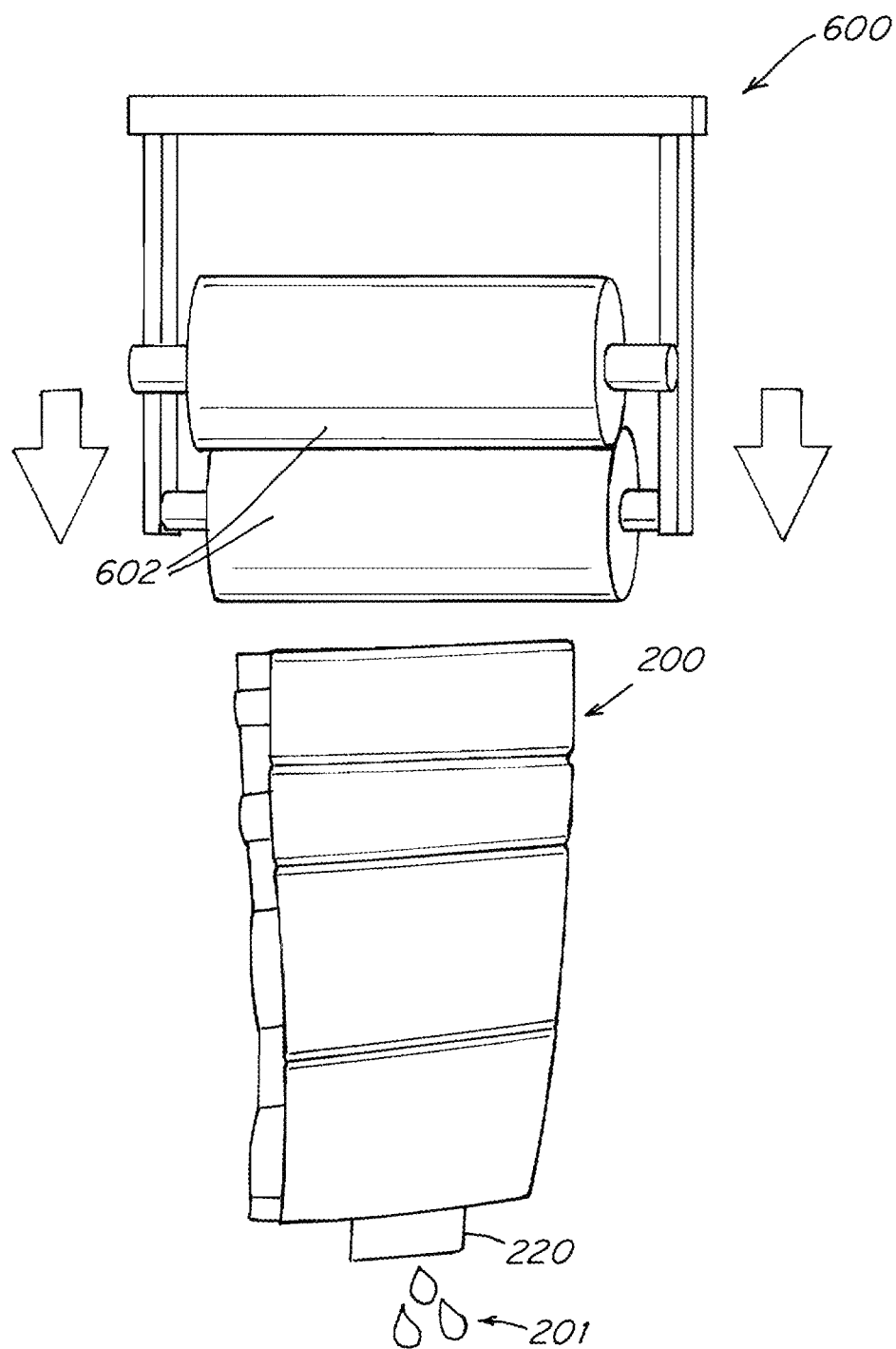
FIG. 14 is a schematic representation of a roller press mechanism.

While juicers including juicing mechanisms with first and second pressing elements that are moved towards one another have been discussed above, the current disclosure is not limited in this fashion. Instead, any appropriate arrangement or configuration of elements used to apply a force to a juicer cartridge in order to extract juice from a juicer cartridge might be used. For example, in another embodiment, and as depicted in FIG. 14, a juicer may include a juicing mechanism 600 configured as a roller press. The roller press includes a pair of rollers 602 which used to compress a juicer cartridge 200 fed between the rollers. For example, the juicer cartridge 200 can pass through a nip defined by the two opposing rolls 602 to compress the food matter contained within the cartridge to extract juice 201. While a particular arrangement of rollers has been depicted, other arrangements are also possible.

While a consumer might fill a juicer cartridge with a food matter for use in a juicer system, in some instances it may be desirable to provide pre-packaged juicer cartridges. Therefore, the consumer merely needs to purchase the pre-packaged juicer cartridges of their choosing to get a desired juice. This may increase the convenience associated with producing juice with a juicer in a home or small commercial environment. Consequently, in some embodiments, a separate packing system may be located in a remotely located food processing facility. This packing system may produce prefilled juicer cartridges and/or individual pouches filled with food matter for use by a consumer. Alternatively, a packing system might be designed on a smaller scale to enable a consumer to produce their own juicer cartridges at home as the disclosure is not so limited.

Figure 15:
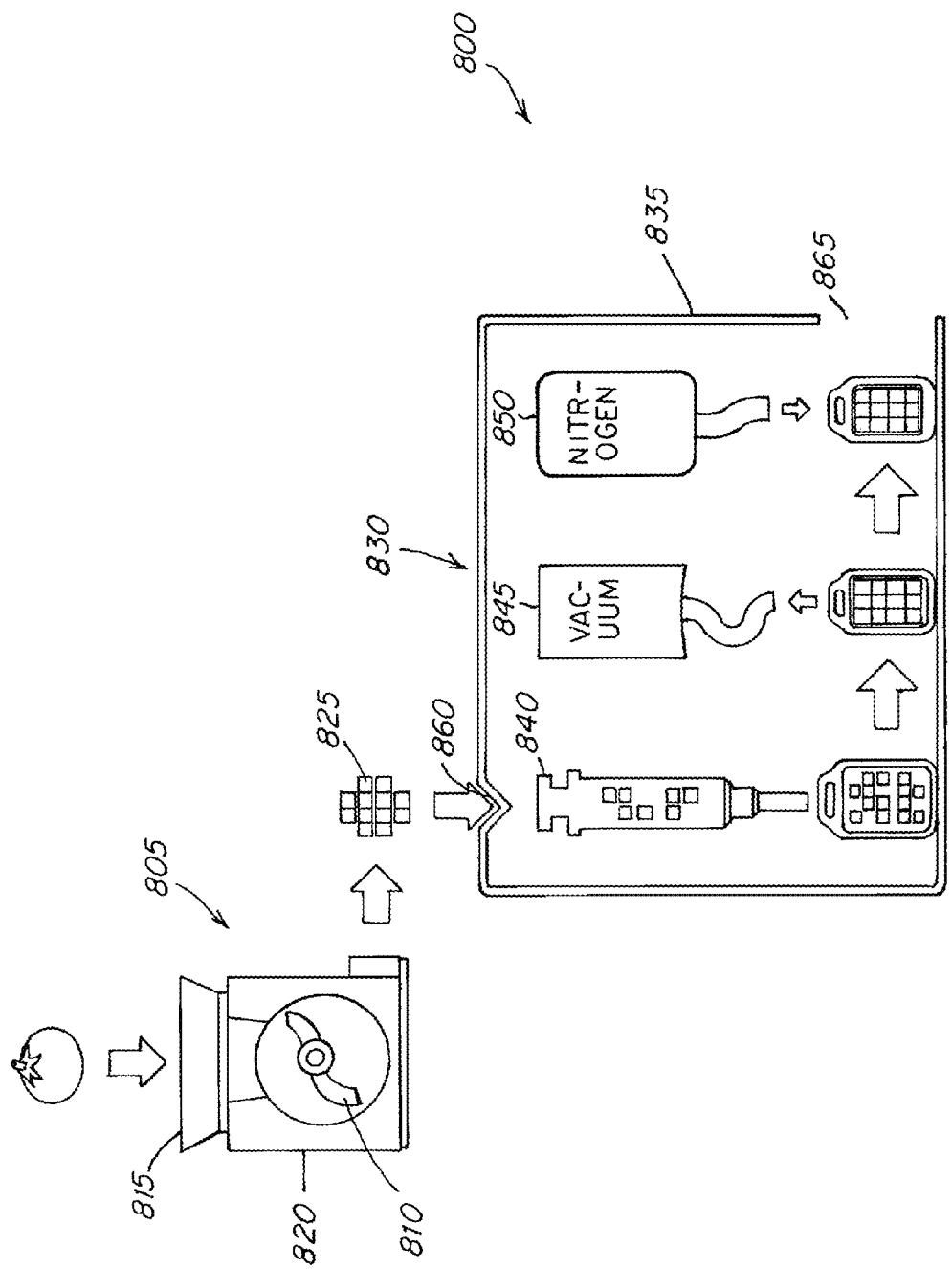
FIG. 15 is a schematic representation of a packing system for filling juicer cartridges.

FIG. 15 depicts one embodiment of a packing system 800 for processing produce into smaller pieces prior to loading as well as loading and sealing of the juicer cartridges. In one embodiment, a packing system 800 may comprise a grinder assembly 805 and packing assembly 830. Packing assembly 830 may further comprise a food matter insertion section 840, vacuum section 845, and gas injection section 850. The packing assembly may further comprise an outer housing 835 that may provide a controlled environment on the interior that may be, for example, impervious to outside air, bacteria, or other contaminants. The food matter insertion section 840, vacuum section 845, and gas injection section 850 may be disposed within the outer housing 880. In some embodiments, the outer housing 835 may also have an opening 860 for processed food matter 825 to enter the packing assembly 830, and another opening 865 through which the finished juicer cartridges may exit the assembly. While a separate grinder 805 and packing assembly 830 have been depicted, depending on the embodiment, the grinder 805 and packing assembly 830 may be integrated within a single housing with a single input port and single output port.

Turning now to the operation, in one embodiment, grinder 805 may comprise a blade 810 within a hopper 815. Hopper 815 may be configured to receive unprocessed food matter (e.g., whole or peeled fruits or vegetables) for further processing. The blade may be connected to a motor, not depicted, and control assembly 820. The control assembly 820 may control the blade 810 to chop the food matter in hopper 815 into processed food matter 825 comprising smaller chunks or pieces that are suitable for juicing. In some embodiments, the blade 810 may be formed from a material that is resistant to frictional heating, such as ceramic, to help reduce heating of the food matter during processing. Additionally, in some embodiments, control assembly 820 may control the blade 810 to rotate at a speed such that the friction of the blade against the food matter does not impart excessive heat to the food matter which could destroy valuable compounds in the food matter. Depending on the desired output, the grinder 805 may output processed food matter 825 in the form of cubes, slices, pulp, or slurry, as disclosed herein. The processed food matter 890 may subsequently be transferred to an associated packing assembly 830 via a conveyor, tube, or other conveyance, for packing.

Upon receiving the processed food matter 825, a food matter injection system 840 may insert the processed food mater 825 into a pouch of the type described herein. This insertion may be accomplished in any number of ways including, but not limited to, the use of a piston-like assembly as depicted in the figure that receives processed food matter and directs it into the juicer cartridge. Therefore, it should be understood that any mechanism capable of transferring processed food matter into the cartridge may be utilized as the disclosure is not so limited. The now filled cartridge may subsequently be transferred to vacuum section 845 where air in the cartridge is removed using any applicable method. An inert gas may then be pumped into the cartridge in the gas injection section 850 before sealing and ejecting the final juicer cartridge from the packing assembly 830. The cartridges may either be sealed with in the packing assembly 830, or they may be sealed in a subsequent step outside of the packing assembly 830.

It should be understood that the above-noted packaging processes may accomplished manually, automatically, or by a combination of both. Then since is where the process is automated, the process may be accomplished with minimal need for manual intervention helping to reduce the overall cost of the juicer system. Additionally, while certain arrangement of the components and processes are described above, embodiments in which any or all of the components are provided in a single system or as multiple discrete components are possible.

EXAMPLES

Figure 16:
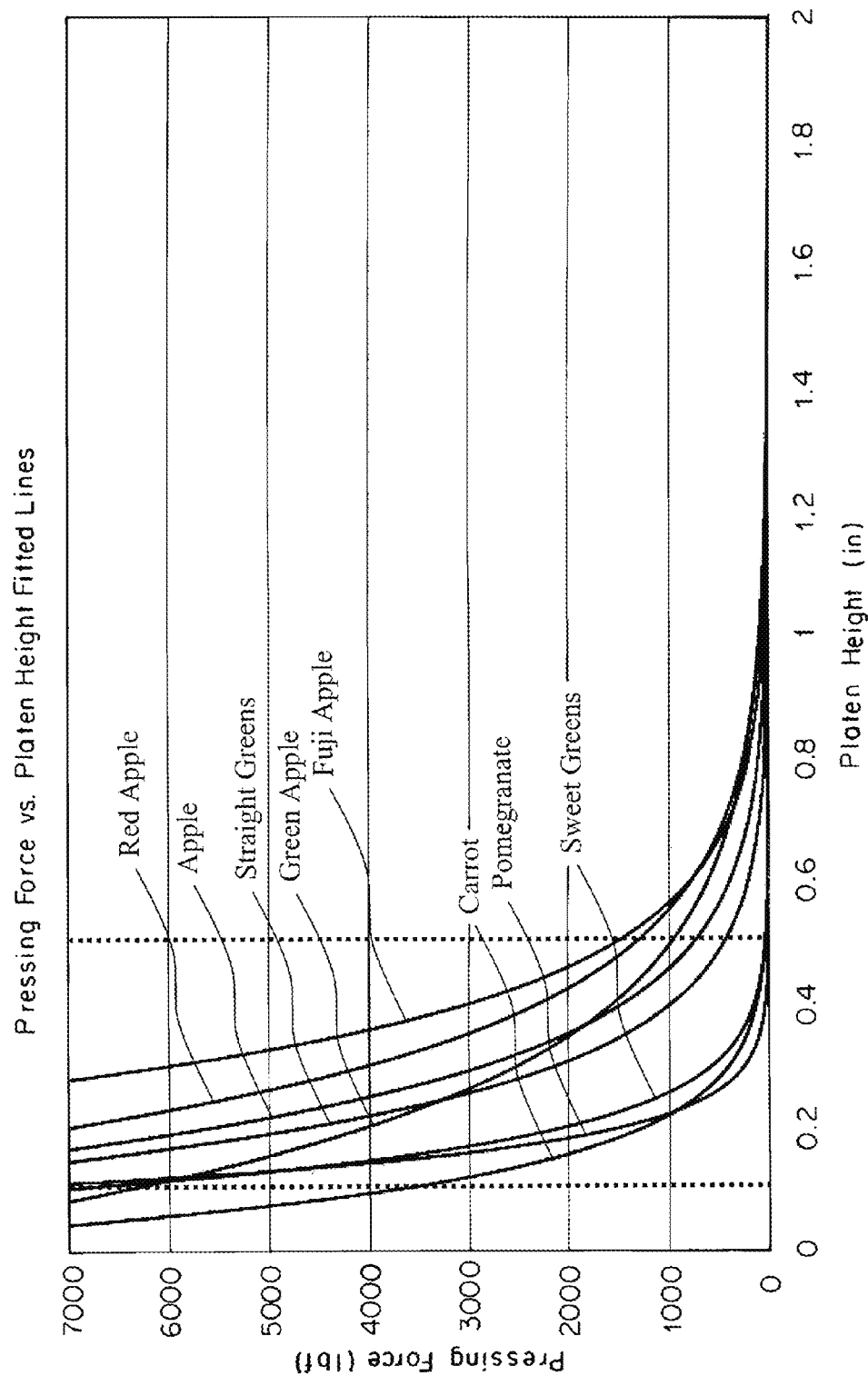
FIG. 16 is a graph of pressing force versus platen height for a variety of fruits, vegetables, and greens during juice extraction.

FIG. 16 presents a graph of pressing force versus platen height during juice extraction for a variety of fruits, vegetables, and greens. As noted above, over and under extraction of juice from a particular type of food matter is undesirable. Therefore, it is desirable to maintain a desired force range during the final portions of juice extraction. The region between the dashed lines between a platen height of about 0.1 inches to about 0.5 inches (about 3 mm to about 13 mm) correspond to applying extraction forces during at least a portion of this final platen displacement that are greater than about 6,700 N (1,500 pounds) and less than 35,600 N (8000 pounds). It should be understood that the present example was sized for a consumer appliance application. Consequently, as noted previously, the forces and platen travel distances are expected to be different for appliances used in an office, corporate, restaurant, and/or food service application.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. For example, the various embodiments described herein may rearranged, separated, and/or combined in any appropriate manner. Accordingly, the foregoing description and drawings are by way of example only.

What is claimed is:

1. A juicer comprising:
   a region configured to receive one or more compressible juicer cartridges including an outlet and food matter contained therein;
   a pressing element configured to apply pressure to the one or more juice cartridges, wherein the region and the pressing element are configured and arranged to dispense fluid extracted from the one or more juicer cartridges without the extracted fluid or the food matter directly contacting the region or pressing element; and
   a cutting element or piercing element configured and arranged to open the outlet of each juicer cartridge of the one or more juicer cartridges.

2. The juicer of claim 1, further comprising a dispensing point associated with the region, wherein the dispensing point is configured and arranged to receive the outlet of each juicer cartridge of the one or more juicer cartridges.

3. A juicer comprising:
   a region configured to receive one or more compressible juicer cartridges including an outlet and food matter contained therein;
   a pressing element configured to apply pressure to the one or more juice cartridges, wherein the region and the pressing element are configured and arranged to dispense fluid extracted from the one or more juicer cartridges without the extracted fluid or the food matter directly contacting the region or pressing element; and
   a dispensing point associated with the region, wherein the dispensing point is configured and arranged to receive the outlet of each juicer cartridge of the one or more juicer cartridges, wherein the region and pressing element are constructed so that the outlet of each juicer cartridge of the one or more juicer cartridges extends beyond the region and pressing element.

4. A juicer comprising:
   a region configured to receive one or more compressible juicer cartridges including an outlet and food matter contained therein;
   a pressing element configured to apply pressure to the one or more juice cartridges, wherein the region and the pressing element are configured and arranged to dispense fluid extracted from the one or more juicer cartridges without the extracted fluid or the food matter directly contacting the region or pressing element; and
   a temperature regulation element configured to control a temperature of the one or more juicer cartridges.

5. The juicer of claim 4, wherein the temperature regulation element is integrated with at least one of the region and the pressing element.

6. The juicer of claim 5, wherein the pressing element is a pressing platen.

7. A juicer comprising:
   a first pressing element;
   a second pressing element, wherein the first pressing element and the second pressing element define a pressing chamber constructed and arranged to contain an associated juicer cartridge; and
   a drive constructed and configured to displace the second pressing element towards the first pressing element, wherein the drive is constructed and configured to apply between about 6700 N to 35,600 N to the juicer cartridge during a final portion of the second pressing element displacement, wherein the final portion of the second pressing element displacement corresponds to between about 3 mm to 13 mm of travel.

8. The juicer of claim 7, wherein a total displacement of the first pressing element by the drive is less than about 38 mm.

9. The juicer of claim 7, wherein a gap between about 4 mm and 9 mm is present between the first pressing element and the second pressing element after the first pressing surface has been fully displaced by the drive.

10. The juicer of claim 7, wherein the drive comprises an electromechanical system.

* * * * *